(12) United States Patent
Sinn et al.

(10) Patent No.: US 10,445,408 B2
(45) Date of Patent: Oct. 15, 2019

(54) AUTOMATICALLY IDENTIFYING COMPLEMENTARY DIGITAL FONTS BASED ON DIGITAL TEXT IN ELECTRONIC DOCUMENTS

(71) Applicant: Adobe Inc., San Jose, CA (US)

(72) Inventors: Richard Sinn, Milpitas, CA (US); Thomas Donahue, Carlsbad, CA (US); Allan Young, Santa Rosa, CA (US)

(73) Assignee: Adobe Inc., San Jose, CA (US)

( * ) Notice: Subject to any disclaimer, the term of this patent is extended or adjusted under 35 U.S.C. 154(b) by 187 days.

(21) Appl. No.: 15/061,796

(22) Filed: Mar. 4, 2016

(65) Prior Publication Data
US 2017/0255597 A1 Sep. 7, 2017

(51) Int. Cl.
*G06F 17/00* (2019.01)
*G06F 17/21* (2006.01)
*G06F 3/0482* (2013.01)
*G06F 3/0484* (2013.01)

(52) U.S. Cl.
CPC .......... *G06F 17/214* (2013.01); *G06F 3/0482* (2013.01); *G06F 3/04842* (2013.01)

(58) Field of Classification Search
CPC ... G06F 17/214; G06F 3/0482; G06F 3/04842
USPC .......................................................... 715/269
See application file for complete search history.

(56) References Cited

U.S. PATENT DOCUMENTS

| | | | | |
|---|---|---|---|---|
| 2011/0289407 | A1* | 11/2011 | Naik ..................... | G06F 17/214 715/269 |
| 2013/0124962 | A1* | 5/2013 | Mitchell ............... | G06F 17/211 715/229 |
| 2016/0307347 | A1* | 10/2016 | Matteson ............... | G06F 17/214 |
| 2017/0004113 | A1* | 1/2017 | Gore ..................... | G06F 3/0482 |
| 2017/0091155 | A1* | 3/2017 | Rajashekara ......... | G06F 3/0482 |

* cited by examiner

*Primary Examiner* — Stephen S Hong
*Assistant Examiner* — Matthew J Ludwig
(74) *Attorney, Agent, or Firm* — Keller Jolley Preece

(57) ABSTRACT

Systems and methods are disclosed for identifying digital fonts. In particular, in one or more embodiments, the disclosed systems and methods detect a digital font, font characteristics, and a text structure with regard to digital text in an electronic document. Moreover, in one or more embodiments, the disclosed systems and methods utilize the detected font characteristics and text structure to search for complementary digital fonts. In particular, one or more embodiments include systems and methods that generate a search query based on determined font characteristics and/or text structures and utilize the search query to automatically identify, recommend, and provide complementary digital fonts for utilization in the electronic document.

20 Claims, 11 Drawing Sheets

AUTOMATICALLY IDENTIFYING COMPLEMENTARY DIGITAL FONTS BASED ON DIGITAL TEXT IN ELECTRONIC DOCUMENTS

BACKGROUND

1. Technical Field

The present disclosure relates generally to selecting digital fonts. More specifically, one or more embodiments of the present disclosure relate to systems and methods that detect digital fonts of digital text in an electronic document and automatically identify complementary digital fonts based on the detected digital fonts.

2. Background and Relevant Art

Recent years have seen a rapid proliferation in the use of mobile devices in creating and editing electronic documents. Indeed, with the ubiquitous use of tablets and smartphones for both personal and business purposes, individuals and businesses are increasingly generating and modifying electronic documents utilizing mobile devices. For example, individuals and businesses routinely utilize mobile devices to create digital marketing materials, digital magazines, webpages, e-mails, and other electronic documents.

Recent years have also seen an increase in digital fonts utilized in electronic documents. For instance, some contemporary digital editing systems provide access to thousands of digital fonts for utilization in conjunction with various electronic documents. Accordingly, individuals and businesses can now access and utilize a wide variety of different digital fonts in generating and modifying electronic documents.

Although the increased number of digital fonts provides numerous options and flexibility for users, the sheer number of digital fonts can also create problems. For example, users often experience frustration in trying to identify digital fonts utilizing conventional digital editing systems. Indeed, searching through thousands of digital fonts offered by conventional digital editing systems requires a significant amount of time and effort, and often leads to irritation and dissatisfaction.

User frustration is often exacerbated with regard to conventional digital editing systems operating on mobile devices (e.g., tablets or smartphones). For instance, mobile devices have more limited processing power, reduced multitasking capabilities, additional limitations with regard to user interfaces (e.g., mobile devices cannot generally provide multiple simultaneous windows), and more limited memory constraints (e.g., insufficient space for thousands of digital fonts). Thus, for example, a user searching for digital fonts on a smartphone with a touchscreen has more limited screen space to utilize than a traditional desktop computing device. Accordingly, searching for and selecting digital fonts with regard to mobile devices can take additional time and effort and lead to additional frustration and dissatisfaction.

These and other problems exist with regard to current techniques for identifying and using digital fonts.

BRIEF SUMMARY

Embodiments of the present disclosure provide benefits and/or solve one or more of the foregoing or other problems in the art with systems and methods that automatically and intelligently recommend digital fonts. In particular, one or more embodiments of the disclosed systems and methods detect digital fonts utilized in an electronic document and recommend additional digital fonts based on the detected digital fonts. More specifically, in one or more embodiments, the disclosed systems and methods conduct a search for additional digital fonts based on the detected digital fonts utilized in an electronic document and recommend additional digital fonts based on the search results.

For example, in one or more embodiments, the systems and methods identify a digital font of a portion of digital text in an electronic document. The systems and methods determine one or more font characteristics of the digital font of the portion of digital text in the electronic document. Thereafter, the systems and methods identify, from a plurality of digital fonts, a subset of digital fonts complementary to the digital font based on the determined one or more font characteristics of the digital font of the portion of the digital text in the electronic document. Moreover, systems and methods render a visual representation of the a subset of digital fonts complementary to the digital font for selection and application to digital text in the electronic document.

Additional features and advantages of exemplary embodiments of the present disclosure will be set forth in the description which follows, and in part will be obvious from the description, or may be learned by the practice of such exemplary embodiments. The features and advantages of such embodiments may be realized and obtained by means of the instruments and combinations particularly pointed out in the appended claims. These and other features will become more fully apparent from the following description and appended claims, or may be learned by the practice of such exemplary embodiments as set forth hereinafter. The foregoing summary is not an extensive overview, and it is not intended to identify key elements or indicate a scope. Rather the foregoing summary identifies aspects of embodiments as a prelude to the detailed description presented below.

BRIEF DESCRIPTION OF THE DRAWINGS

In order to describe the manner in which the above recited and other advantages and features of the invention can be obtained, a more particular description of the invention briefly described above will be rendered by reference to specific embodiments thereof that are illustrated in the appended drawings. It should be noted that the figures are not drawn to scale, and that elements of similar structure or function are generally represented by like reference numerals for illustrative purposes throughout the figures. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

Figure 1A:
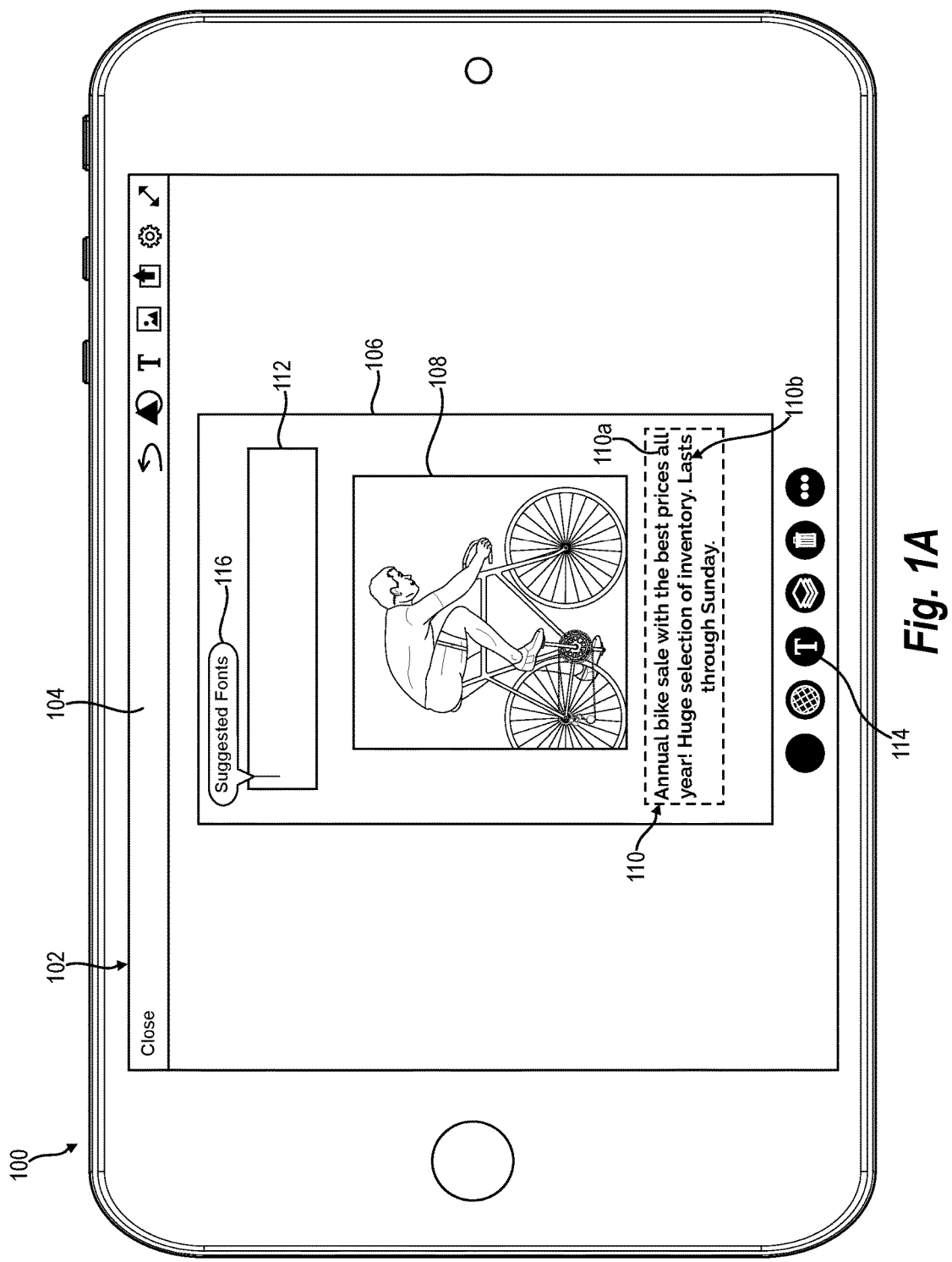
FIG. 1A illustrates a mobile device with a touchscreen displaying a user interface for creating and editing electronic documents with digital text in accordance with one or more embodiments.

One or more embodiments of the present disclosure include a digital font selection system that identifies complementary digital fonts. In particular, in one or more embodiments, the digital font selection system detects a digital font of digital text utilized in an electronic document and recommends additional digital fonts complementary to the digital font utilized in the electronic document. More specifically, the digital font selection system identifies font characteristics corresponding to a digital font utilized in an electronic document to search for and recommend additional digital fonts.

By searching for and recommending complementary digital fonts based on font characteristics of existing digital fonts, the digital font selection system enables users to identify digital fonts quickly and easily. Indeed, in one or more embodiments, the digital font selection system automatically recommends complementary digital fonts (e.g., without user input of font characteristics or search parameters). Accordingly, the digital font selection system provides users with access to thousands of digital fonts, while reducing the time and effort required to identify digital fonts complementary to existing digital fonts already utilized in an electronic document.

Furthermore, the digital font selection system reduces the time and frustration associated with identifying complementary digital fonts on mobile devices. Indeed, despite various constraints in processing, screen space, operation, and memory of mobile devices, the digital font selection system can search thousands of digital fonts and recommend complementary digital fonts to mobile devices based on font characteristics of existing digital text. Moreover, upon identifying a digital font desired by a user, the digital font selection system can download the additional digital font to the mobile device. Accordingly, users of mobile devices can enjoy the creative benefits of thousands of digital fonts, while avoiding the frustration of searching through large numbers of digital fonts.

In one or more embodiments, the digital font selection system preserves valuable space and processing resources on mobile devices by storing digital fonts on one or more remote servers. Indeed, in one or more embodiments, the digital font selection system stores digital fonts on a remote server, conducts a search of font characteristics to identify a subset of digital fonts that are complementary, presents visual representations of the subset of digital fonts on the mobile device, and only downloads particular complementary digital fonts selected for utilization at the mobile device from the remote server. In this manner, the digital font selection system provides access to a wide array of digital fonts without unnecessarily exhausting resources of computing devices to store unselected and/or unutilized digital fonts. Accordingly, the digital font selection system improves both the speed of computing devices and allows computing devices to devote resources to other computing demands.

As just discussed, in recommending one or more digital fonts, the digital font selection system detects one or more font characteristics. In particular, the digital font selection system detects a variety of font characteristics corresponding to a digital font of digital text in an electronic document. For example, in one or more embodiments, the digital font selection system determines one or more of a font classification (e.g., Sans Serif, Serif, Slab Serif, Script, Blackletter, Mono, Hand, or Decorative), a font weight, a font width, an x-height, a contrast, or a capitalization style (e.g., standard or caps only) corresponding to a digital font of digital text in an electronic document.

Moreover, the digital font selection system utilizes one or more font characteristics to identify and recommend additional digital fonts. In particular, in one or more embodiments, the digital font selection system maintains a database (e.g., metadata) associating a plurality of digital fonts with corresponding font characteristics. The digital font selection system searches the database utilizing detected font characteristics of digital text in an electronic document to identify complementary digital fonts. For example, in one or more embodiments, the digital font selection system generates a search query based on one or more of a font classification, a font weight, a font width, an x-height, a contrast, or a capitalization style corresponding to a digital font utilized in an electronic document.

Furthermore, in one or more embodiments, the digital font selection system identifies and recommends complementary digital fonts based on a particular text structure. As used herein the term "text structure" refers to a structural use of digital text within a document. In particular, the term text structure includes a category of use of digital text based on a particular arrangement of the digital text. For example, a "text structure" can include a heading (e.g., a concise arrangement of large digital text in the form of a title, banner, or explanatory phrase), a paragraph (e.g., a long block of small digital text in an electronic document), or a caption (e.g., digital text utilized as an explanation or description of an illustration, table, figure, or other element in an electronic file). In addition, a "text structure" can also include a footer (e.g., small digital text appearing at the bottom of an electronic document). An electronic document can comprise a plurality of text structures or a plurality of text structures of the same type. For example, an electronic document can comprise a first heading text structure, a second heading text structure, and a first paragraph text structure, etc. Moreover, as described further below, in one or more embodiments, the digital font selection system detects or estimates text structures with regard to an electronic document.

As mentioned, the digital font selection system recommends an additional digital font based on a text structure. For example, in one or more embodiments, the digital font selection system detects a digital font of a digital text utilized in an electronic document. The digital font selection system determines a text structure corresponding to the digital text (e.g., a paragraph text structure). The digital font selection system then recommends one or more digital fonts based on the determined text structure (e.g., recommends a digital font for a heading to complement the digital font in the paragraph).

The digital font selection system can determine a text structure of digital text in an electronic document in a variety of ways. For example, the digital font selection system determines a text structure based on a size of digital text (e.g., a large text indicates a heading text structure). Similarly, the digital font selection system determines a text structure based on a size of a bounding box associated with the digital text. Moreover, the digital font selection system can determine a text structure based on a number of lines in digital text (e.g., a larger number of lines indicates a paragraph).

In addition to the foregoing, the digital font selection system optionally recommends additional digital fonts based on a formatting model. As used herein, the term "formatting model" refers to a plurality of text structures applicable to an electronic document. In particular, the term "formatting model" includes a plurality of text structures anticipated, expected, or recommended for an electronic document. For example, in one or more embodiments, the digital font selection system generates a formatting model for an electronic document comprising a plurality of text structures. For instance, the digital font selection system can suggest the following formatting model for an electronic document: three heading text structures (e.g., heading 1, heading 2, and heading 3), two paragraph text structures (e.g., text 1 and text 2), and one caption text structure (e.g., caption 1).

Moreover, as just mentioned, the digital font selection system can recommend additional digital fonts based on the formatting model. For example, the digital font selection system can detect text in an electronic document and determine that the detected text corresponds to a first heading text structure (e.g., heading 1). The digital font selection system can identify a formatting model for the electronic document. For example, the digital font selection system can identify a formatting model comprising two heading text structures (e.g., heading 1 and heading 2) and a paragraph text structure (e.g., paragraph 1). Based on the determined first heading text structure and the formatting model for the electronic document, the digital font selection system can recommend a digital font for the second heading text structure (e.g., heading 2) and a digital font for the paragraph structure (e.g., paragraph 1). In this manner, the digital font selection system can suggest digital fonts with regard to a plurality of different text structures.

In one or more embodiments, the digital font selection system identifies or generates a formatting model based on one or more characteristics of an electronic document. For example, in one or more embodiments, the digital font selection system identifies or generates a formatting model based on a type of electronic document (e.g., letter, marketing material, publication, business card, or other document type). Thus, for instance, the digital font selection system can detect that an electronic document corresponds to a business card and identify or generate a formatting model comprising fewer text structures (e.g., a single heading text structure and a single paragraph text structure).

In addition to font characteristics and text structures, in one or more embodiments, the digital font selection system suggests one or more complementary digital fonts based on digital fonts selected by other computing devices and/or users. For example, in one or more embodiments, the digital font selection system tracks digital fonts utilized in electronic documents generated by a plurality of other computing devices. The digital font selection system can utilize the tracked digital fonts to suggest complementary digital fonts. For instance, upon detecting selection of a first digital font at a mobile device, the digital font selection system can identify and recommend complementary digital fonts utilized by fonts selected for use on other computing devices with the first digital font.

Figure 1B:
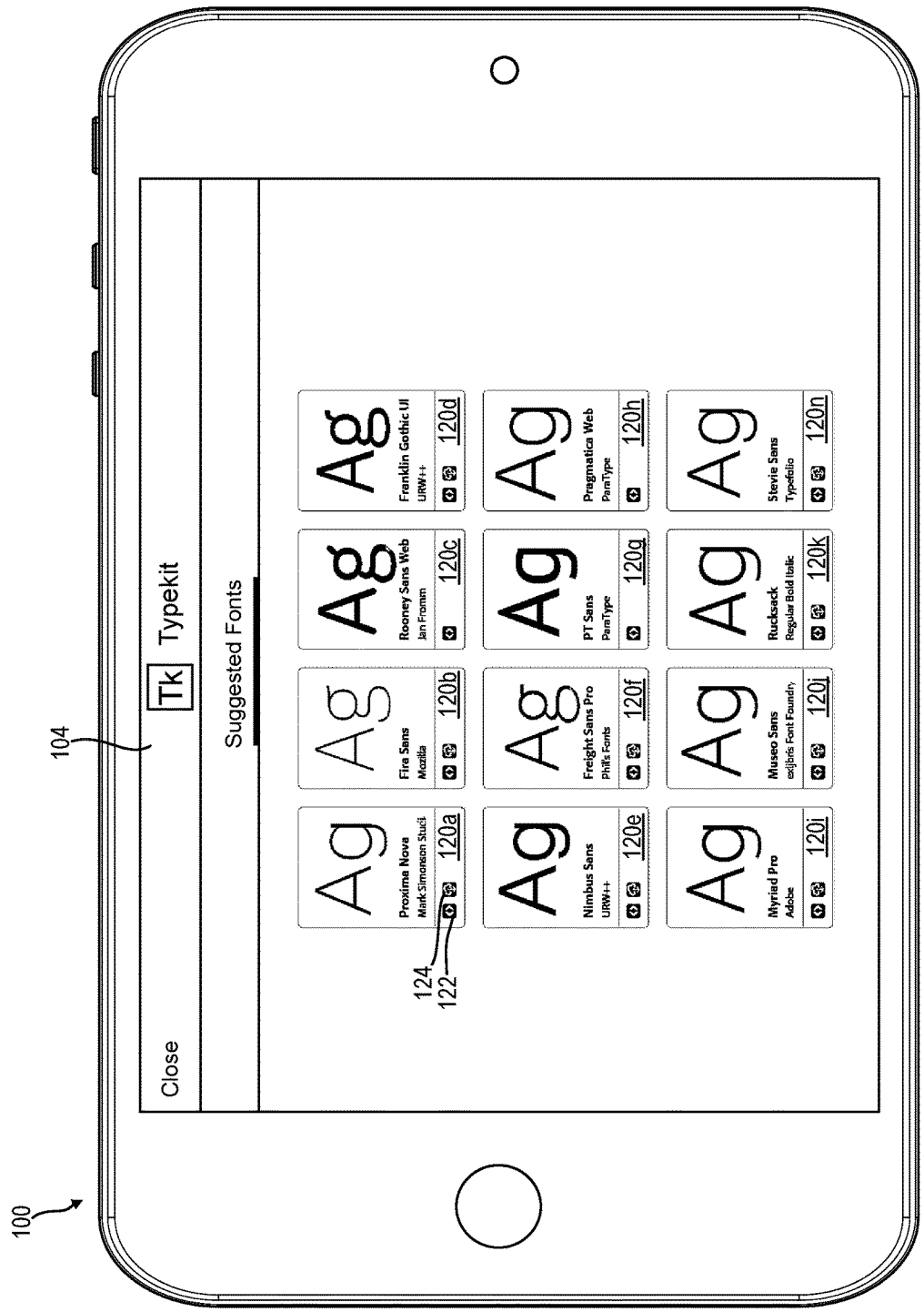
FIG. 1B illustrates the mobile device of FIG. 1A with visual representations of complementary digital fonts in accordance with one or more embodiments.
Figure 1C:
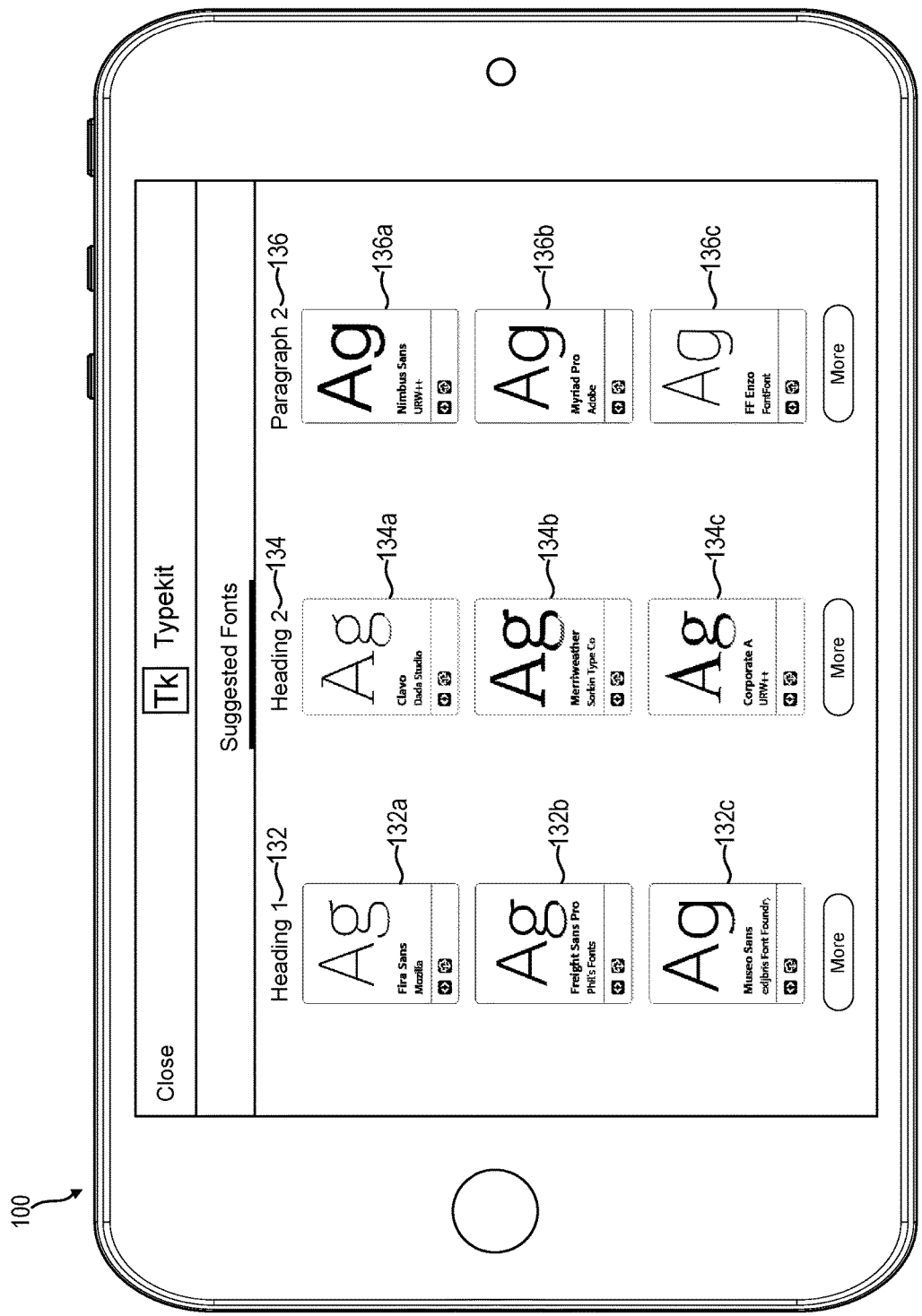
FIG. 1C illustrates the mobile device of FIG. 1A with visual representations of complementary digital fonts organized with regard to various text structures in accordance with one or more embodiments.

Turning now to FIGS. 1A-1C, additional detail will be provided regarding recommending digital fonts via a user interface corresponding to a computing device in accordance with one or more embodiments. In particular, FIG. 1A illustrates a mobile device 100 with a touchscreen 102 displaying a user interface 104 corresponding to an electronic document application.

The mobile device 100 can comprise any type of mobile device. As used herein, the term "mobile device" refers to a portable computing device. In particular, the term "mobile device" includes a mobile phone, smartphone, PDA, tablet, watch, or other device sized and configured for portable use. For example, a mobile device includes a handheld computing device having a touchscreen. With regard to FIG. 1A, the mobile device 100 comprises a tablet with the touchscreen 102.

As shown in FIG. 1A, the user interface 104 comprises a plurality of user interface elements. In particular, the user interface 104 includes a rendering of an electronic document 106, a digital image 108, a first text section 110, and a second text section 112. The user interface 104 also includes a plurality of selectable options, including the selectable text option element 114.

As used herein, the term "electronic document" refers to any form of electronic content, regardless of form. For example, an electronic document can include electronic files in the form of a word processing document, a PDF file, an image file, an e-mail file, a text file, a web page, or any other electronic file. An electronic document includes an electronic advertisement, brochure, flyer, or other digital marketing material. Similarly, an electronic document includes an electronic book, magazine, periodical, or other digital publication. Thus, as shown in FIG. 1A, the electronic document 106 comprises a digital advertisement.

As shown, the first text section 110 corresponds to digital text 110a (i.e., "Annual bike sale . . . ") having a digital font 110b. As used herein, the term "digital font" refers to a defined set of digital characters. In particular, the term "digital font" includes a collection of digital characters of a particular style or typeface. A digital font includes digital files with the following or other extensions: .ttf, .otf, .fnt, .abf, .ttc, .suit, .woff, .vnf, .t65, .sfp, .sfd, .pmt, .pfm, .pfb, .pfa, .odtff, .mf, .gdr, .fon, .fnt, .etx, .eot, .compositefont, .acfm, .afm, or .amfm. For example, the term digital font includes digital fonts such as Times New Roman, Helvetica, Arial, Raleway, Proxima Nova, Fira Sans, or Stevie Sans.

In one or more embodiments, the digital font selection system identifies the digital font 110b. In particular, the digital font selection system detects the digital text 110a of the first text section 110 and identifies the digital font 110b corresponding to the digital text 110a. For example, in one or more embodiments, the digital font selection system determines the digital font 110b based on data stored on the mobile device 100. Specifically, with regard to FIG. 1A, the digital font selection system accesses metadata corresponding to the first text section 110 that identifies the digital font 110b applied to the digital text 110a. For instance, in one or more embodiments, the digital font selection system receives the following metadata regarding the first text section 110, indicating that the digital font 110b is a digital font entitled "Raleway-Bold":

```
{
    "id": "TkD-18456-6a48387d2e6aa830d0ef4347b6f0cafa62e0ff0d",
    "family": "Raleway",
    "family_opaque_id": "nqdy",
    "links": {
        "family": "https://api.typekit.com/desktop_v2/families/nqdy",
        "self": "https://api.typekit.com/desktop_v2/fonts/TkD-18456-
6a48387d2e6aa830d0ef4347b6f0cafa62e0ff0d"
    },
    "optical_size": 10,
    "postscript_name": "Raleway-Bold",
    "sort_order": 1400,
    "type": "ttf",
    "variation": "Bold",
    "version": "Version 2.001; ttfautohint (v0.8) -G 200 -r 50"
},
```

In addition to identifying the digital font 110b, the digital font selection system can also determine one or more font characteristics. For instance, the digital font selection system can determine a font classification (e.g., Serif, Sans Serif, Slab Serif, Script, Blackletter, Mono, Hand, or Decorative). Similarly, the digital font selection system can determine a weight, a width, an x-height, a contrast, or a capitalization style. Moreover, the digital font selection system can determine glyph curvature, available languages (e.g., languages supported by the digital font), a figure style (e.g., a numbering style), or availability (e.g., whether a digital font is available via a web application or available for download to a computing device).

The digital font selection system can determine font characteristics corresponding to a digital font in a variety of ways. For instance, in one or more embodiments, the digital font selection system accesses a database (e.g., metadata) defining digital fonts and corresponding font characteristics. For example, the digital font selection system identifies a digital font, accesses a database associating font characteristics and digital fonts, and utilizes the database to identify font characteristics corresponding to the digital font.

Similarly, in one or more embodiments, the digital font selection system determines font characteristics from metadata (e.g., metadata corresponding to a digital font, digital text, or textual element). In one or more embodiments, the digital font selection system identifies metadata corresponding to a digital text in an electronic document that identifies the digital font and one or more font characteristics. For example, the digital font selection system accesses one or more JSON files (i.e., JavaScript Object Notation). The digital font selection system utilizes JSON files that relate one or more font characteristics to one or more digital fonts. Upon identifying a digital font, the digital font selection system can access the JSON file and determine one or more font characteristics corresponding to the digital font.

The digital font selection system can determine one or more font characteristics via a local computing device or via a remote server. For example, the digital font selection system stores a font characteristics database (e.g., metadata) identifying font characteristics at the mobile device 100. The digital font selection system alternatively or additionally stores a font characteristics database at a remote server and provides font characteristics to the mobile device 100 from the remote server.

For example, the digital font selection system can receive digital fonts on a remote server from a variety of sources (e.g., digital fonts generated by third parties and/or origination from third party servers). The digital font selection system can identify font characteristics corresponding to the digital fonts at the remote server and store the font characteristics in a database at the remote server. The digital font selection system can provide the font characteristics (e.g., metadata) to the mobile device 100 (e.g., upon request by the mobile device 100).

With regard to FIG. 1A, the digital font selection system identifies the digital font 110b as a digital font entitled "Raleway-Bold." Moreover, the digital font selection system determines font characteristics corresponding to the digital font 110b. Specifically, the digital font selection system accesses metadata indicating that Raleway-Bold has the following font characteristics: Sans Serif classification, light weight, regular width, large x-height, low contrast, and standard capitalization style.

In addition to font characteristics, the digital font selection system can also determine one or more text structures corresponding to digital text an electronic document. With regard to FIG. 1A, for example, the digital font selection system can determine a text structure corresponding to the digital text 110a. The digital font selection system can determine a text structure corresponding to digital text based on a variety of factors. For example, in relation to FIG. 1A, the digital font selection system determines a font size (e.g., 10-point font) corresponding to the digital text 110a and a size of the first text section 110 (e.g., the size of a bounding box corresponding to the first text section 110). Moreover, the digital font selection system identifies a number of lines (e.g., 3 lines) corresponding to the digital text 110a. Based on the font size, the size of the textual element and the number of lines, the digital font selection system determines that the digital text 110a corresponds to a paragraph text structure.

In addition to font size, size of a textual element, or a number of lines, the digital font selection system can also determine text structure based on other digital text properties. For example, the digital font selection system can determine a text structure based on a number of words, a number of sentences, a location of digital text within a document (e.g., top, bottom, middle, centered, left side, or right side), or a location of digital text in relation to other elements (e.g., above, below, beside other digital elements). For instance, in one or more embodiments, the digital font selection system determines digital text corresponding to a caption text structure based on a digital text located in close proximity to an image or other element.

In one or more embodiments, the digital font selection system determines a text structure by comparing properties of digital text to one or more rules (e.g., defined threshold properties) corresponding to a particular text structure. For example, the digital font selection system can define a paragraph text structure as having at least a threshold number of words, sentences, and/or lines. Similarly, the digital font selection system can define a paragraph text structures as having a font size below a threshold font size. In addition, the digital font selection system can define a heading as having a font size exceeding a threshold font size and having less than a threshold number of lines.

With regard to the embodiment of FIG. 1A, for example, the digital font selection system determines that the digital text 110a has a small font size (e.g., 10 point font, which falls below a threshold font size corresponding to a paragraph text structure), a large number of lines (e.g., 3 lines, which falls above a threshold number of lines corresponding to a paragraph text structure), and a large number of sentences (e.g., 3 sentences, which falls above a threshold number of sentences corresponding to a paragraph text structure). Accordingly, the digital font selection system determines that the digital text 110a corresponds to a paragraph text structure.

Upon identifying one or more font characteristics and one or more text structures, the digital font selection system can utilize the one or more font characteristics and the one or more text structures to search for, identify, and/or recommend a subset of digital fonts (e.g., a limited number, such as for example, 8, 10, or 12) from a database of a plurality of digital fonts (a large number of fonts, such as, for example, thousands of fonts). In particular, the digital font selection system can automatically (e.g., without user input of search parameters) search for, identify, and recommend additional digital fonts based on detected font characteristics and text structures.

For example, with regard to the embodiment of FIG. 1A, the digital font selection system determines that the digital font 110b (i.e., "Raleway-Bold") has the following characteristics: Sans Serif font classification, light weight, regular width, large x-height, low contrast, and standard capitalization style. Moreover, the digital font selection system determines that the digital font 110b corresponds to a paragraph text structure. Accordingly, the digital font selection system generates a search query with the following parameters:
Classification: Sans Serif
Type: Paragraph
Weight: Light
Width: Regular
X-Height: Large
Contrast: Low
Capitalization Style: Standard In one or more embodiments, upon generating a search query, the digital font selection system applies the search query. In particular, the digital font selection system applies the search query (e.g., as a filter) to a database of digital fonts. For example, the digital font selection system applies a search query to a database that associates a plurality of digital fonts to a plurality of font characteristics.

The digital font selection system can store a database (e.g., metadata) of digital fonts locally on the mobile device 100 or one or more remote servers. Thus, the digital font selection system can apply a search query to a database of digital fonts stored on the mobile device 100 or the digital font selection system can send a search query to remote server that can conduct a search of a database of digital fonts stored on the remote server.

The digital font selection system can identify one or more digital fonts that correspond to a search query and search query parameters. In particular, the digital font selection system can compare search query parameters with font characteristics stored in a database of digital fonts and identify digital fonts that match the search query parameters. For example, with regard to the embodiment of FIG. 1A, the digital font selection system identifies digital fonts with a Sans Serif classification, paragraph type, light weight, regular width, large x-height, low contrast, and/or standard capitalization style.

Upon identifying one or more digital fonts that correspond to search query parameters, the digital font selection system provides the identified digital fonts for display. Indeed, as mentioned previously, in one or more embodiments, the digital font selection system automatically suggests a subset of digital fonts. Specifically, the digital font selection system renders a visual representation of one or more complementary digital fonts.

For example, as shown in FIG. 1A, upon the user creating the second text section 112, the digital font selection system provides a selectable suggestion element 116. The selectable suggestion element 116 provides an indication that the digital font selection system can recommend additional digital fonts (e.g., has identified complementary digital fonts or can search for complementary digital fonts). Upon user interaction with the selectable suggestion element 116, the digital font selection system provides for display a subset of digital fonts complementary to the digital font 110b.

For instance, FIG. 1B illustrates the mobile device 100 displaying the user interface 104 with a plurality of complementary digital font previews 120a-120n. In particular, in one or more embodiments, the digital font selection system renders the complementary digital font previews 120a-120n upon selection of the selectable suggestion element 116.

As mentioned, the digital font selection system identifies the complementary digital fonts corresponding to the complementary digital font previews 120a-120n based on the digital font 110b. Specifically, the complementary digital font previews 120a-120n reflect the results of generating a search query based on the font characteristics and text structure of the digital text 110a and applying the search query to a database of digital fonts.

As shown with regard to the embodiment of FIG. 1B, the complementary digital font previews 120a-120n provide a visual representation of information regarding the complementary digital fonts. In particular, the digital identification system renders a visual representation of sample text (i.e., "Ag") utilizing each complementary digital font. The digital identification system also provides an indication of the name of the complementary digital font (e.g., "Proxima Nova" or "Fira Sans") and the source of the complementary digital font (e.g., "Mark Simonson Studio" or "Mozilla").

In addition, the complementary digital font previews 120a-120n also include information with regard to availability of the complementary digital fonts. For example, digital font indication 120a includes a web indication 122 and a sync indication 124. The web indication 122 specifies that the digital font "Proxima Nova" is available for use on the web. For example, a user can add the digital font "Proxima Nova" to a web kit, publish, embed the digital font, and utilize the digital font on a cascading style sheet.

Similarly, the sync indication 124 specifies that the digital font "Proxima Nova" is available to sync to the mobile device 100. In particular, the sync indication 124 signifies that the digital font "Proxima Nova" is not currently installed on the mobile device 100 but is available for download. For example, the digital identification system can access the digital font "Proxima Nova" from a remote server and download the digital font to the mobile device 100 based on user interaction with the sync indication 124. Thus, the digital identification system identifies a subset of digital fonts from a database (e.g., metadata) of digital fonts on a remote server and provides a preview of the subset of digital fonts. This allows a user to search for and find a complementary font from a large number of fonts without having to scroll through or otherwise search or review a large number of fonts using the mobile device.

In addition to providing complementary digital fonts for display, the digital identification system can also enable a computing device to utilize the complementary digital fonts. For example, upon user interaction with the complementary digital font indication 120a, the digital identification system enables the mobile device 100 to utilize the digital font "Proxima Nova." Specifically, in relation to FIG. 1A, upon user interaction with the complementary digital font indication 120a, the digital font selection system downloads the "Proxima Nova" digital font to the mobile device 100 from a repository of digital fonts and applies the digital font "Proxima Nova" to the second text section 112 such that digital text entered into the second text section 112 reflects the "Proxima Nova" font.

Notably, from the perspective of a user of the mobile device 100, the digital font selection system recommends a plurality of digital fonts (e.g., the complementary digital font previews 120a-120n) without any user input of search query parameters or other information. Indeed, the digital font selection system presents the digital font previews 120a-120n without user input of a desired font classification, weight, width, x-height, or any other font characteristic or search parameter. Rather, the digital font selection system automatically recommends a plurality of digital fonts complementary to the digital font 110b. Thus, enabling a user of the mobile device 100 to identify and utilize complementary digital fonts from a large document repository without a significant investment in time and effort.

It will be appreciated that the digital font selection system presents recommendations with regard to complementary digital fonts in a variety of ways and in response to a variety of user interactions. Indeed, although the embodiments of FIGS. 1A-1B utilize user interaction with the selectable suggestion element 116 to trigger visual representations with regard to complementary digital fonts, in other embodiments, the digital font selection system utilizes other user interface elements (or no elements at all) to trigger presentation of a visual representation for display. For example, in one or more embodiments, user interaction with the selectable text option element 114 provides a user interface with a plurality of user interface elements, including a selectable option for suggesting complementary digital fonts.

In one or more embodiments, the digital font selection system automatically provides digital font recommendations without user interaction with a selectable element. Indeed, in one or more embodiments, upon detecting creation of a textual element (e.g., creation of the second text section 112) or entry of digital text, the digital font selection system provides a visual representation of additional digital fonts. For example, upon detecting a new textual element or entry of digital text, the digital font selection system provides a side bar (or other tool bar) that provides a visual representation of complementary digital fonts.

Furthermore, it will be appreciated that the digital font selection system can recommend a digital font at any point in time. Indeed, although FIG. 1A illustrates recommending digital fonts before any text has been entered in the second text section 112, the digital font selection system can recommend a digital font before entry of digital text, after entry of digital text, or during entry of digital text. Similarly, the digital font selection system can recommend a digital font upon creation of a text element. In addition, as already discussed, the digital font selection system can also identify additional digital fonts at any point upon user interaction with a selectable element (e.g., the selectable text option element 114).

In addition, it will be appreciated that although the embodiment of FIGS. 1A-1B utilize a particular search query based on particular font characteristics and text structure, the digital font selection system can generate a variety of different search queries. For example, with regard to the embodiment of FIGS. 1A-1B the search query mirrors the detected font characteristics and detected text structure of the digital text 110a and the digital font 110b (e.g., upon detecting a Sans Serif classification the digital font selection system conducts a search for digital fonts also having a Sans Serif classification). In one or more embodiments, however, the digital identification system generates a search query that differs from the detected font characteristics and/or text structures.

The digital identification system generates a search query that differs from detected font characteristics based on a variety of factors. For example, the digital font selection system identifies different font characteristics and/or text structures that complement detected font characteristics and/or text structures and utilizes the different font characteristics and/or text structures in searching for complementary digital fonts. For instance, with regard to the digital font 110b, "Raleway-Bold," the digital identification system can determine that the digital font 110b corresponds to a Sans Serif classification. The digital identification system can also determine that the font classifications "Serif" and "Slab Serif" complement the "Sans Serif" classification. Accordingly, the digital identification system can generate a search query that includes Sans Serif, Serif, and/or Slab Serif parameters upon detecting a digital font comprising a Sans Serif classification.

The digital font selection system can identify a complementary relationship between one or more font characteristics. For example, in one or more embodiments, the digital font selection system maintains a database of complementary font characteristics (e.g., characteristics that are visually appealing, balancing, or coordinating with other characteristics). Upon detecting font characteristics with regard to a digital font utilized in an electronic document, the digital font selection system identifies complementary font characteristics utilizing the database of complementary font characteristics and generates a search query. Thus, for example, a database of complementary font characteristics can outline that condensed width fonts utilized in a paragraph text structure are visually appealing when coupled with heavy weight heading type fonts. Accordingly, upon detecting a condensed width font in a paragraph text structure, the digital font selection system can generate a search query comprising heavy weight heading type fonts.

The digital font selection system can also generate a search query (and suggest additional digital fonts) based on digital fonts selected and/or utilized by other computing devices. In particular, in one or more embodiments the digital font selection system tracks digital fonts utilized by a plurality of different computing devices (such as the mobile device 100). In particular, the digital font selection system can manage a database that correlates digital fonts and font characteristics utilized in the same electronic documents. The digital font selection system can utilize the database to generate a search query.

For example, upon detecting that the mobile device 100 utilizes the digital font 110b with regard to the electronic document 106, the digital font selection system accesses a database that correlates digital fonts and/or font characteristics utilized in electronic documents. Specifically, the digital font selection system determines that other computing devices that utilized a Sans Serif, light weight, digital font (such as Raleway-Bold) also utilized Serif, heavy weight, paragraph type fonts. Based on how other computing devices utilized these digital fonts, upon detecting user of Raleway-Bold with regard to the digital text 110a, the digital font selection system generates a search query that comprises parameters to capture Serif, heavy weight, paragraph type fonts.

Similarly, the digital font selection system can also determine (e.g., from a database of digital fonts utilized by other computing devices) that other computing devices utilizing Raleway Bold digital font also tend to utilize a Proxima Nova digital font. Accordingly, upon detecting that the mobile device 100 utilizes Raleway Bold with regard to the digital text 110*a*, the digital font selection system suggests Proxima Nova as an additional digital font.

Moreover, the digital font selection system can manage a database that tracks digital fonts suggested, but not selected, at a plurality of computing devices. For example, upon suggesting Stevie Sans to the mobile device 100 (as shown in FIG. 1B), the digital font selection system also tracks that the mobile device 100 did not select or utilize Stevie Sans with regard to the electronic document 106. The digital font selection system tracks such suggestions and non-selections with regard to a plurality of computing devices. The digital font selection system then generates a search query based on the tracked information.

For example, the digital font selection system maintains a database of suggestions and non-selections with regard to a plurality of computing devices. The digital font selection system analyzes the database and determines that computing devices that utilize Raleway-Bold font rarely utilize Stevie Sans font. Accordingly, the digital font selection system can modify a search query (and/or recommendations) such that Stevie Sans is no longer recommended.

Similarly, the digital font selection system analyzes the database and determine that computing devices that utilize Sans Serif, light weight digital fonts with regard to paragraph text structures rarely utilize Sans Serif, light weight, condensed width, digital fonts with regard to heading text structures. Accordingly, upon detecting utilization of a Sans Serif, light weight, digital font, the digital font selection system can exclude Sans Serif, light weight, condensed width, heading type digital fonts.

Furthermore, in one or more embodiments, the digital font selection system can also rank complementary digital fonts. Specifically, the digital font selection system can present a visual representation of complementary digital fonts ranked in a particular order. The digital font selection system can rank digital fonts according to a variety of factors or characteristics depending on the embodiment. For example, the digital font selection system ranks additional digital fonts based on the number of other computing devices (or users) that have utilized a particular digital font in conjunction with an existing digital font. Similarly, the digital font selection system ranks additional digital fonts based on general popularity (e.g., the total number of times a particular digital font has been utilized by a single computing device or a plurality of computing devices).

In one or more embodiments, the digital font selection system also generates a search query (and identifies additional digital fonts) based on digital fonts utilized previously by a particular mobile device or user. For example, with regard to the embodiment of FIG. 1A, the digital font selection system can determine that the mobile device 100 (or a user corresponding to the mobile device 100) has previously utilized the "Fira Sans" font in other electronic documents. The digital font selection system can modify a search (or recommendation) based on the determination that the mobile device 100 (or user corresponding to the mobile device 100) has previously utilized the font "Fira Sans."

In addition, the digital font selection system can determine that the mobile device 100 (or a user corresponding to the mobile device 100) has previously utilized fonts with particular font characteristics. For example, the digital font selection system tracks the number of times the mobile device 100 (or a user corresponding to the mobile device 100) utilizes Sans Serif fonts and determines that the mobile device 100 utilizes Sans Serif fonts more frequently than other fonts. The digital font selection system includes Sans Serif as a parameter in a search query based on the determination that the mobile device 100 utilizes Sans Serif fonts more frequently.

Similarly, the digital font selection system can determine that the mobile device 100 utilizes particular combinations of font characteristics. For example, the digital font selection system determines that the mobile device 100 utilizes Sans Serif, light weight fonts with regard to paragraph text structures together with Slab Serif, heavy weight fonts with regard to heading text structures. Upon detecting utilization of Sans Serif, light weight font with regard to a paragraph text structure, the digital font selection system generates a search query comprising parameters for Slab Serif, heavy weight, digital fonts for heading text structures.

Moreover, it will be appreciated that although FIG. 1B illustrates twelve complementary digital elements 120*a*-120*n*, that the digital font selection system can identify and display a greater or fewer number of previews (e.g., suggestions or indications of complementary digital fonts). Moreover, in one or more embodiments, the digital font selection system controls the number of complementary digital results to display.

For example, in one or more embodiments, the digital font selection system generates (or modifies) a search query to control the number of results. Specifically, in one or more embodiments, the digital font selection system will generate a first search query and determine a first number of results. The digital font selection system will compare the first number of results with a threshold number of desirable results. If the first number of results is greater than the threshold number of desirable results (or less than the threshold number of desirable results), the digital font selection system can modify the search query parameters.

For instance, the digital font selection system generates a search query with three different parameters (e.g., Script classification, heavy weight, extended width parameters), applies the search parameters to a database of digital fonts, and identifies only a single resulting digital font (e.g., "Kari Pro Wide"). The digital font selection system can compare the number of resulting digital fonts (i.e., one font) to a threshold number of desirable results (e.g., eight to fifteen) and determine that the number of resulting digital fonts is less than the threshold number of results. Based on that determination, the digital font selection system can modify the search query parameters. For example, the digital font selection system removes one of the three parameters (e.g., search for only Script classification, heavy weight parameters) to control the number of results.

Similarly, the digital font selection system can generate a search query that returns a number of digital fonts that exceeds a threshold number of desirable results. In one or more embodiments, the digital font selection system can apply additional search parameters to reduce the number of resulting digital fonts. Alternatively, the digital font selection system provides only a predetermined number of the search results.

As mentioned previously, in one or more embodiments, the digital font selection system selects complementary digital fonts based on one or more text structures and/or a formatting model applicable to an electronic document. Specifically, in one or more embodiments, the digital font selection system generates or identifies a formatting model that estimates a number and type of textual structures with regard to an electronic document. For example, in one or more embodiments, the digital font selection system estimates that an electronic document will have three heading text structures (e.g., three heading text structures with three different fonts), two different paragraph text structures (e.g., two different paragraph text structures with two different fonts), and one caption text structure. The digital font selection system recommends digital fonts based on this formatting model and a detected text structure in an electronic document.

For example, FIG. 1C illustrates the mobile device 100 providing recommendations based on a formatting model. In particular, with regard to the embodiment of FIG. 1C, the digital font selection system estimates that the electronic document 106 will utilize two heading text structures with two different fonts and two different paragraph text structures with two different fonts.

As discussed above with regard to FIG. 1A, the digital font selection system has already detected a first paragraph text structure corresponding to the first text section 110. Moreover, the digital font selection system has determined that the first paragraph text structure corresponding to the first text section 110 utilizes a digital font 110b (i.e., Raleway Bold). Thus, the digital font selection system determines an existing paragraph text structure (i.e., "paragraph 1") and a corresponding digital font (i.e., Raleway Bold).

The digital font selection system utilizes the existing text structure together with the generated formatting model to recommend additional digital fonts. For example, as shown in FIG. 1C, the digital font selection system generates recommendations with regard to a first heading text structure 132, a second heading text structure 134, and a second paragraph text structure 136. Specifically, the digital font selection system provides for display a plurality of digital font previews 132a-132c corresponding to the first heading text structure 132, provides for display a plurality of digital font previews 134a-134c corresponding to the second heading text structure 134, and provides for display a plurality of digital font previews 136a-136c corresponding to the second paragraph text structure 136.

The digital font selection system generates the plurality of digital font previews 132a-132c, 134a-134c, and 136a-136c based on the digital text 110a, the digital font 110b, and the formatting model. In particular, the digital font selection system generates a search query based on the digital font 110b and its font characteristics, the text structure corresponding to the digital text 110a (i.e., paragraph 1), and the text structures corresponding to the formatting model.

For example, with regard to the first heading text structure 132 and the second heading text structure 134, the digital font selection system determines that the digital text 110a corresponds to a paragraph text structure. Accordingly, the digital font selection system utilizes the formatting model (e.g., a heading 1, heading 2, paragraph 1, and paragraph 2) and determines to provide recommendations for two heading text structures. The digital font selection system identifies font characteristics corresponding to the digital font 110b and generates two different search queries based on the font characteristics.

For example, the digital font selection system determines that the digital font 110b corresponds to a Sans Serif, light weight, regular width, large x-height, and low contrast digital font. Accordingly, the digital font selection system generates a first search query that corresponds to the font characteristics of the digital font 110b (albeit for a heading type digital font rather than a paragraph type digital font). In particular, the digital font selection system utilizes the following search query parameters:
Classification: Sans Serif
Type: heading
Weight: light
Width: regular
X-height: large
Contrast: low The digital font selection system also generates a second search query. In particular, the digital font selection system generates a second search query with different search parameters. For example, the digital font selection system can generate a second search query that utilizes a different font classification parameter. In particular, the digital font selection system generates a second search query that comprises a Serif classification parameter (e.g., a classification that is complementary to, but different, then Sans Serif). In this manner, the digital font selection system identifies and recommends a variety of digital fonts with regard to a plurality of text structures in a formatting model for an electronic document.

The digital font selection system can also vary other parameters in generating the second search query. For example, with regard to the embodiment of FIG. 1C the digital font selection system utilizes the following search parameters with regard to identifying digital fonts in relation to the second heading structure:
Classification: Serif
Type: heading
Weight: light
Width: regular
X-height: large
Contrast: low
Notably, this search query differs in both classification and x-height in relation to font characteristics corresponding to the digital font 110b. It will be appreciated that the digital font selection system can modify any font characteristics to identify and suggest complementary digital fonts.

In addition to generating search queries with regard to the first heading text structure 132 and the second heading text structure 134, the digital font selection system also utilizes a third search query to identify additional digital fonts corresponding to the second paragraph text structure 136. As described, the digital font selection system can generate a search query that mirrors the font characteristics of the digital font 110b or generate a search query with parameters that vary from the font characteristics of the digital font 110b.

Upon generating search queries, the digital font selection system applies the search queries to a database of digital fonts to identify complementary digital fonts corresponding to each of the text structures 132-136. Moreover, the digital font selection system provides the resulting digital fonts or metadata to the mobile device 100 for display. In this manner, the digital font selection system identifies and generates the plurality of digital font previews 132a-132c, 134a-134c, and 136a-136c.

Although FIG. 1C illustrates suggesting digital fonts with regard to a particular formatting model (i.e., a formatting model comprising heading 1, heading 2, paragraph 1, and paragraph 2 text structures), it will be appreciated that the digital font selection system can utilize a variety of alternative formatting models (e.g., heading 1, heading 2, heading 3, paragraph 1, paragraph 2, and caption 1 text structures).

For example, in one or more embodiments, the digital font selection system generates a formatting model with different text structures based on one or more characteristics of an electronic document. The digital font selection system can detect a variety of characteristics of an electronic document in determining a formatting model. For example, the digital font selection system can detect a type of electronic document, the dimensions of an electronic document, the elements of an electronic document (e.g., image elements, video elements, text elements), the size of elements of an electronic document, the arrangement and proximity of elements in an electronic document, or the text of an electronic document.

For example, with regard to FIGS. 1A and 1C, the digital font selection system determines that the electronic document comprises two text sections 110, 112 and the digital image 108. The digital font selection system can determine that the digital image 108 is the largest element, and the two text sections 110, 112 are situated above and below the digital image 108. Moreover, the digital font selection system detects words within the text sections 110, 112 corresponding to marketing and advertising (e.g., sale, inventory prices). Based on these characteristics, the digital font selection system determines that the electronic document is an advertisement or marketing material. Moreover, based on that determination the digital font selection system identifies a corresponding formatting model.

Similarly, in one or more embodiments, the digital font selection system generates the electronic document 106 from a template (e.g., a template advertisement, a template business card, or a template banner). In such cases, the digital font selection system determines the type of document based on the template. For example, the digital font selection system receives a user selection of a template advertisement and the digital font selection system utilizes a formatting model corresponding to the template advertisement.

It will be appreciated that although FIG. 1A illustrates a single existing portion of digital text (e.g., the digital text 110a) with a single digital font (e.g., the digital font 110b) in the electronic document 106, the digital font selection system can also select digital fonts based on a plurality of existing digital fonts and digital texts in an electronic document. For example, the digital font selection system generates a search query based on font characteristics corresponding to a plurality of digital fonts utilized in an electronic document. Moreover, the digital font selection system can apply a search query based on font characteristics corresponding to a plurality of digital fonts to identify complementary digital fonts.

In one or more embodiments, the digital font selection system generates a search query based on a plurality of existing digital fonts by identifying the common font characteristics in relation to the plurality of existing digital fonts. For example, if a digital font selection system detects a first digital font (e.g., a light weight Sans Serif digital font) and a second digital font (e.g., a heavy weight Sans Serif digital font), the digital font selection system can identify the font characteristics shared by both the first digital font and the second digital font (e.g., Sans Serif) and conduct a search based on the shared font characteristics.

In one or more embodiments, the digital font selection system generates a search query that includes all font characteristics of a plurality of digital fonts. For example, if a digital font selection system detects a first digital font that corresponds to a Sans Serif classification and detects a second digital font that corresponds to a Slab Serif classification, the digital font selection system generates a search query for digital fonts corresponding to either Sans Serif or Slab Serif classifications.

Moreover, the digital font selection system can utilize any of the techniques described above with regard to generating and utilizing search queries in relation to a plurality of existing digital fonts. For example, the digital font selection system modifies a search query based on complementary font characteristics or text structures, generates search queries based on digital fonts utilized by other computing devices or users, generates search queries based on digital fonts utilized by the mobile device 100 or a user of the mobile device 100, etc.

Figure 2:
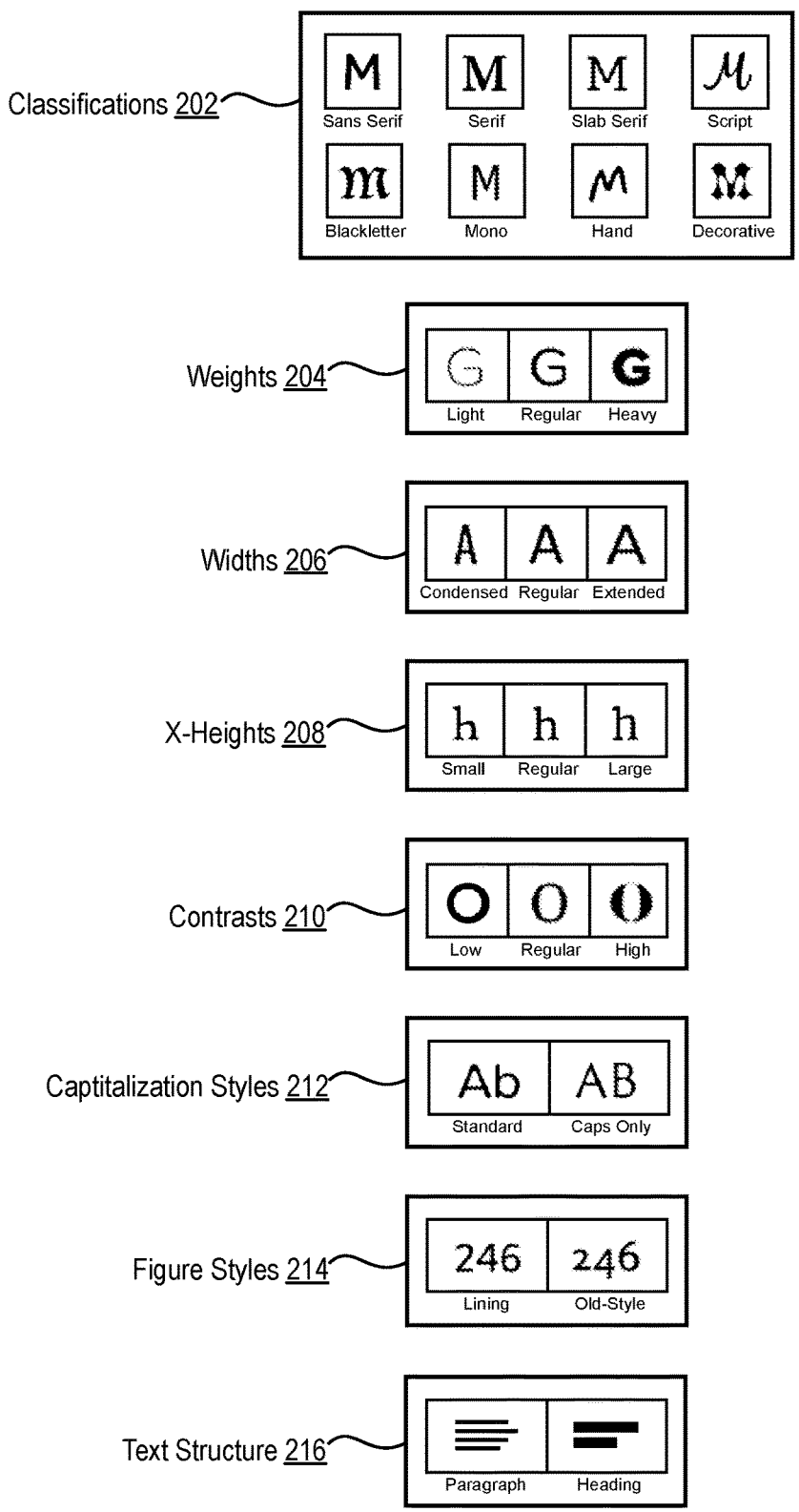
FIG. 2 illustrates a plurality of font characteristics in accordance with one or more embodiments.

Turning now to FIG. 2 additional detail will be providing regarding font characteristics utilized in accordance with one or more embodiments. In particular, FIG. 2 illustrates a plurality of font characteristics 202-216. More particularly, FIG. 2 illustrates classifications 202, weights 204, widths 206, x-heights 208, contrasts 210, capitalization styles 212, figure styles 214, and text structures 216.

As described above, in one or more embodiments, the digital font selection system defines a plurality of fonts with regard to one or more font characteristics. In particular, the digital font selection system generates and manages a database of digital fonts that associates a plurality of digital fonts with corresponding font characteristics. The digital font selection system can dynamically add, modify, and remove digital fonts and corresponding font characteristics as digital fonts are generated or modified.

The font characteristics 202-216 illustrated in FIG. 2 provide an indication of font characteristics utilized to define digital fonts according to one or more embodiments. Specifically, the digital font selection system can generate and maintain a database that defines any digital font according to the font characteristics 202-216. Moreover, the digital font selection system can search digital fonts based on the font characteristics 202-216.

For instance, with regard to the font classifications 202, and as shown with regard to the embodiment of FIG. 2, the digital font selection system categorizes digital fonts into eight classifications, "Sans Serif," "Serif," "Slab Serif," "Script," "Blackletter", "Mono," "Hand," and "Decorative." It will be appreciated that each of these terms corresponds to recognized typeface categories.

As used herein, and as shown in FIG. 2, font weight describes thickness of strokes (e.g., lines) making up characters in a digital font. Accordingly, in one or more embodiments, with regard to the font weights 204, the digital font selection system divides digital fonts into three categories (light, regular, and heavy weights) based on the thickness of strokes making up characters in a digital font.

Moreover, as shown in FIG. 2, as used herein font width refers to the width of characters in a digital font. Accordingly, in one or more embodiments, with regard to the font widths 206, the digital font selection system divides digital fonts into three categories (condensed, regular, and extended widths) based on the width of characters in a digital font.

In addition, as used herein, font x-height refers to the distance between the baseline and the mean line of lower-case letters in a digital font. As shown in FIG. 2, in one or more embodiments, with regard to the font x-heights 208, the digital font selection system divides digital fonts into three categories (small, regular, and large x-heights) based on the distance between the baseline and the mean line of lower-case letters in a digital font.

As used herein, and as shown in FIG. 2, contrast refers to the difference in thickness of vertical and horizontal strokes in a digital font. As illustrated, in one or more embodiments, with regard to the font contrasts 210, the digital font selection system divides digital fonts into three categories (low, regular, and high) based on the difference in thickness of vertical and horizontal strokes in a digital font.

Furthermore, in one or more embodiments, with regard to the font capitalization style 212, the digital font selection system divides digital fonts into standard or caps only categories. Similarly, in one or more embodiments, with regard to the font figure styles 214, the digital font selection system divides digital fonts into old-style (i.e., numerals that vary in height and width and variously extend above or below the baseline) or lining (i.e., numerals of uniform height and width) categories.

Moreover, as shown in FIG. 2, the digital font selection system can also identify digital fonts based on the text structure 216. In particular, the digital font selection system divides digital fonts based on whether the fonts are recommended for utilization in paragraph text structures or heading text structures (or other text structures). For example, in one or more embodiments, the digital font selection system determines digital fonts recommended for paragraph text structures based on whether a digital font renders well for continuous text at small sizes. Similarly, the digital font selection system can recommend digital fonts for paragraph text structures with large x-height that are manually hinted to perform well across operating systems. Moreover, in one or more embodiments, the digital font selection system determines digital fonts recommended for heading text structures based on whether they render well for short text at medium to large sizes.

It will be appreciated that although FIG. 2 illustrates particular categories of font characteristics, the digital font selection system can utilize other font characteristics or categories. For example, rather than utilizing three categories of font widths (i.e., condensed, regular, and large), weights, x-heights, etc., in other embodiments, the digital font selection system utilizes a smaller or larger number of categories. Moreover, although FIG. 2 illustrates particular font characteristics, it will be appreciated that the digital font selection system can utilize any type or variety of font characteristics. For example, in one or more embodiments, the digital font selection system also defines digital fonts based on language (e.g., languages supported by the font), availability, or glyph curvature.

Figure 3:
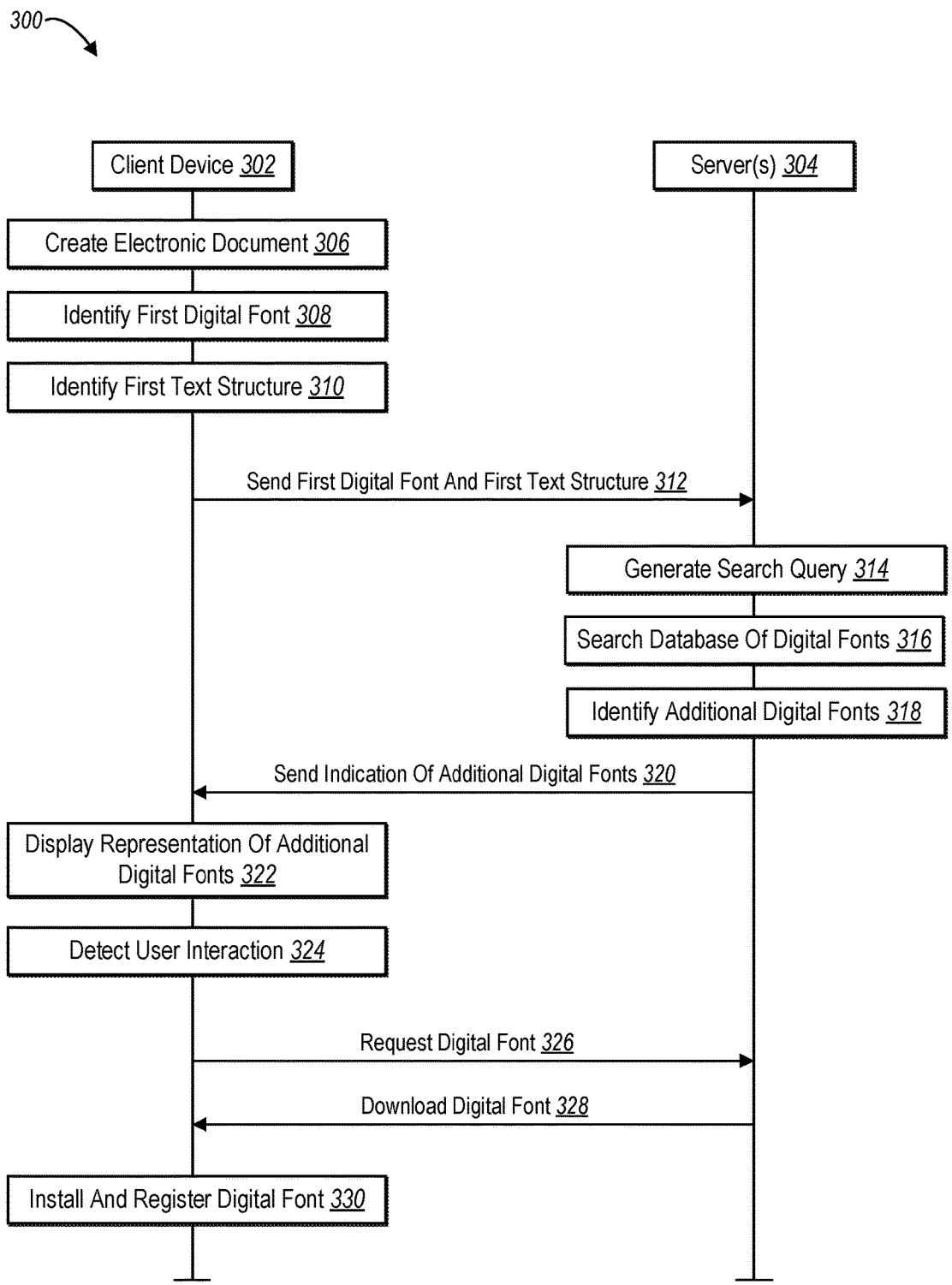
FIG. 3 illustrates a sequence diagram representing a series of steps in a method of selecting digital fonts in accordance with one or more embodiments.

Turning now to FIG. 3 additional detail is provided regarding steps in selecting digital fonts in accordance with one or more embodiments. Specifically, FIG. 3 illustrates a sequence diagram portraying a plurality of steps 306-330 performed in relation to a client device 302 and server(s) 304 in a method 300 of selecting complementary digital fonts. As shown in FIG. 3, the method 300 may include the step 306 of creating an electronic document at the client device 302 (e.g., the mobile device 100). In one or more embodiments, the step 306 includes creating an electronic document with a first digital font.

The digital font selection system can create an electronic document with a first digital font in a variety of ways. For example, in one or more embodiments, the digital font selection system enables a user to open an electronic document and select a first digital font. In one or more embodiments, the digital font selection system loads a first digital font based on environmental factors (e.g., based on a particular language or location). Moreover, in one or more embodiments, the digital font selection system provides a plurality of template electronic documents (e.g., a template letter or a template business card). A user can select the template electronic document and the digital font selection system can create an electronic document with a first digital font based on the selected template.

Upon creating an electronic document, the client device 302 performs the step 308 of identifying a first digital font. Moreover, the client device 302 performs the step 310 of identifying a first text structure. In particular, the step 310 includes detecting digital text corresponding to the first digital font and identifying a text structure corresponding to the digital text.

Moreover, as shown in FIG. 3, at step 312 the client device 302 sends the first digital font and the first text structure to the server(s) 304. In particular, the client device 302 sends information identifying the first digital font (e.g., Raleway-Bold) and the first text structure (e.g., a paragraph text structure). For example, in one or more embodiments the client device 302 sends an indication to the server(s) 304 comprising metadata (e.g., metadata describing the first digital font and/or the first text structure).

As shown in FIG. 3, at step 314, the server(s) 304 generates a search query. In particular, the server(s) 304 generates a search query based on the first digital font and the first text structure. For example, the server(s) 304 generates a search query with parameters that mirror font characteristics corresponding to the first digital font and the first text structure. Specifically, the server(s) 304 accesses a database (e.g., metadata) of digital fonts and identifies font characteristics corresponding to the first digital font and the first text structure. Moreover, the server(s) 304 utilizes the identified font characteristics to generate a search query.

As described previously, the server(s) 304 (and/or the client device 302) also optionally generates a search query based on a formatting model. For example, the server(s) 304 identify one or more characteristics corresponding to the electronic document and generate a formatting model comprising a plurality of text structures (e.g., paragraph 1, paragraph 2, heading 1, and heading 2). The server(s) 304 can utilize the formatting model to generate one or more search queries.

At step 316, the server(s) 304 searches the database of digital fonts. In particular, the server(s) 304 searches the database of digital fonts utilizing one or more generated search queries. Specifically, the server(s) 304 searches the database of digital fonts utilizing a search query based on the font characteristics of the first digital font, the first text structure, and/or the formatting model.

Moreover, the server(s) 304 performs the step 318 of identifying additional digital fonts. For instance, the server(s) 304 identifies additional digital fonts based on the results of the search conducted at step 316. More particular, the server(s) 304 identifies additional digital fonts complementary to the first digital font based on the results of the search of the database of digital fonts.

As shown, upon identifying additional digital fonts, the server(s) 304 performs the step 320 of sending additional digital fonts or metadata for such digital fonts to the client device 302. For instance, the server(s) 304 sends data to the client device 302 identifying the additional digital fonts. For example, in one or more embodiments, the server(s) 304 sends a title, source, availability, and/or font characteristics corresponding to the additional digital fonts. Similarly, in one or more embodiments, the server(s) 304 sends a visual representation of additional fonts (e.g., data representative of a rendering of sample text of the additional digital fonts).

In response to receiving the additional digital fonts, the client device 302 performs the step 322 of displaying a representation of the additional digital fonts. In particular, the client device 302 displays a visual representation of the additional digital fonts, such as a rendering of sample text of the additional digital fonts, a title of the additional digital fonts, text describing a source of the additional digital fonts, an available of the additional digital fonts, or some other visual representation.

As shown in FIG. 3, the client device 302 also performs the step 324 of detecting a user interaction. For example, the client device 302 detect user interactions with a visual representation of an additional font. Specifically, the client device 302 detects a selection of a visual representation of an additional font.

In response to detecting a user interaction (e.g., user selection of an additional digital font), the client device 302 performs the step 326 of requesting a digital font from the server(s) 304. In particular, the client device 302 sends a request for a selected digital font (i.e., the digital font selected based on the user interaction at step 324) to the server(s) 304.

In response, the server(s) 304 performs the step 328 of downloading the digital font (e.g., the requested digital font) to the client device 302. Upon downloading the digital font, the client device 302 performs the step 330 of installing and registering the digital font (e.g., the requested digital font). In particular, the client device 302 installs and registers the digital font so that the client device 302 can utilize the digital font within the electronic document (i.e., the electronic document created at step 306).

In this manner, one or more embodiments of the digital font selection system automatically recommend and provide digital fonts to a client device. Indeed, upon creating an electronic document and utilizing a first digital font, the client device can receive additional digital fonts complementary to the first digital font. Moreover, the client device can download, install, and utilize the complementary digital fonts. Accordingly, the digital font selection system can automatically recommend and provide additional digital fonts without unnecessarily tying up resources (i.e., storage space and processing power) in relation to a client device.

It will be appreciated that the method described in relation to FIG. 3 may be performed with less or more steps/acts or the steps/acts may be performed in differing orders. Additionally, the steps/acts described herein may be repeated or performed in parallel with one another or in parallel with different instances of the same or similar steps/acts. The method 300 is intended to be illustrative of one or more methods in accordance with the present disclosure, and is not intended to limit potential embodiments. Alternative embodiments can include additional, fewer, or different steps than those articulated in FIG. 3. Moreover, although FIG. 3 illustrates the steps/acts occurring in relation to a particular device (e.g., the client device 302 and/or the server(s) 304) it will be appreciated that each of the steps/acts can be performed in relation to the client device 302, the server(s) 304, or some other device. For example, each of the steps/acts can be performed by the client device 302.

For example, in one or embodiments, the digital font selection system performs the method 300 without the steps 322 and 324 of displaying a representation of additional digital fonts and detecting a user interaction. Indeed, in one or more embodiments, the digital font selection system automatically downloads and installs a subset of digital fonts to the client device 302 without displaying and detecting a user interaction (e.g., a selection) of an additional digital font. In this manner, the digital font selection system can make additional digital fonts complementary to a first digital font automatically available for utilization on the client device 302 without unnecessarily installing an entire repository of digital fonts on the client device 302.

In one or more embodiments, the digital font selection system also performs the method 300 without performing steps 312 and 320 (i.e., sending the first digital font and the first text structure to the server(s) 304 and sending the additional digital fonts to the client device 302). Rather, in one or more embodiments, the steps 314, 316, and 318 are performed at the client device 302. Specifically, the client device 302 generates a search query, searches a database of digital fonts (e.g., metadata stored on the client device 302 that correlates digital fonts to font characteristics) and identifies additional digital fonts. In this manner, one or more embodiments of the digital font selection system allow for local searching and identifying of additional digital fonts without requiring the additional storage space and processing power required to download and manage an entire repository of digital fonts.

Figure 4:
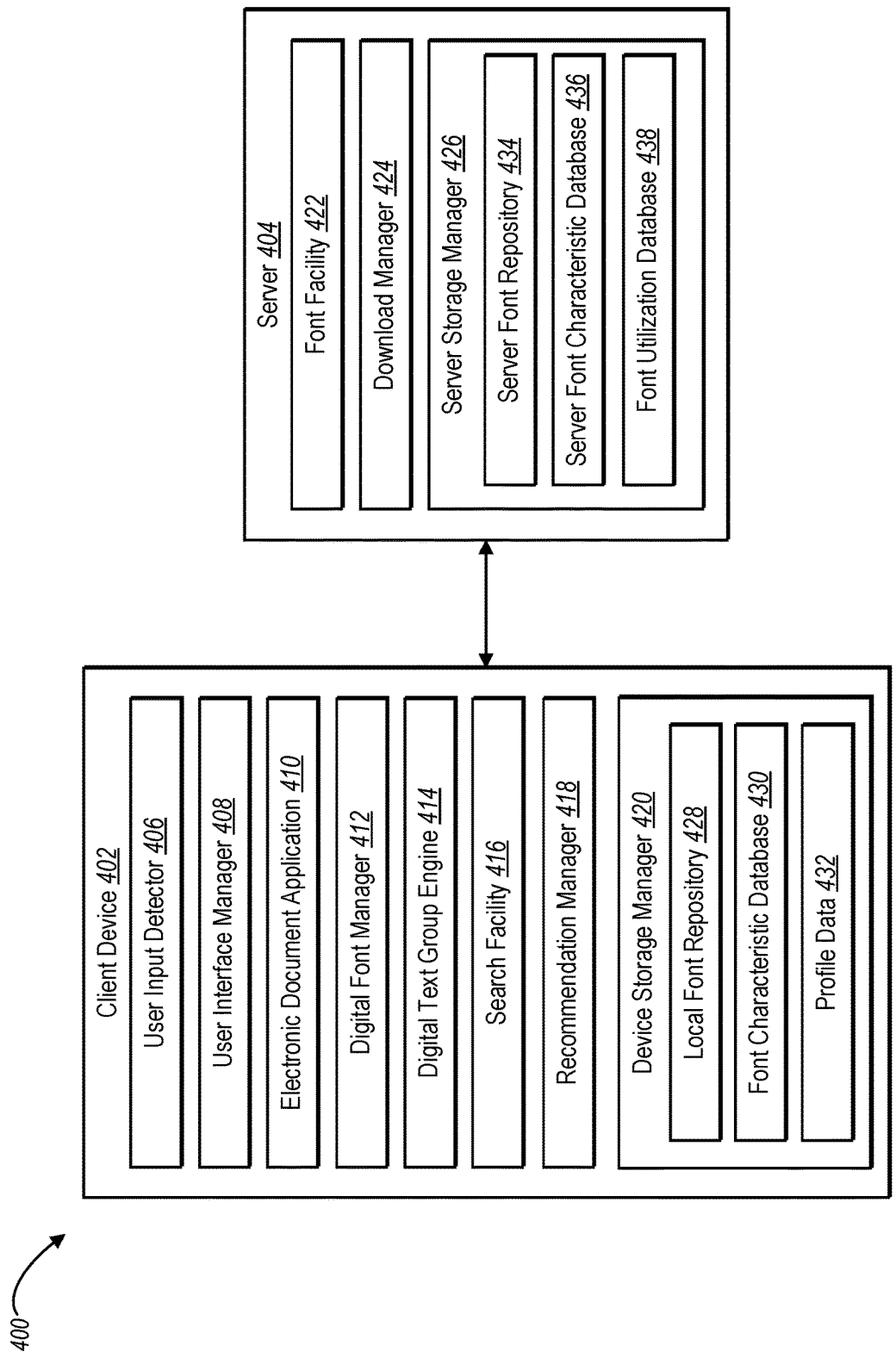
FIG. 4 illustrates a schematic diagram of a digital font selection system in accordance with one or more embodiments.

Turning now to FIG. 4, additional detail is provided regarding components and capabilities of one embodiment of the digital font selection system. In particular, FIG. 4 illustrates an embodiment of an exemplary digital selection system 400 (e.g., the digital font selection system described above). As shown, the digital selection system 400 may be implemented, at least in part, on a client device 402 (e.g., the mobile device 100 or the client device 302) and a server 404 (e.g., the server(s) 304). Moreover, as shown, the digital font selection system includes, but is not limited to a user input detector 406, a user interface manager 408, an electronic document application 410, a digital font manager 412, a text structure engine 414, a search facility 416, a recommendation manager 418, and a device storage manager 420 (comprising a local font repository 428, a font characteristics database 430, and profile data 432). Furthermore, as shown in FIG. 4, a portion of the digital font selection system can be implemented on the server 404. As illustrated, the digital font selection system implemented by the server 404 includes, but is not limited to, a font facility 422, a download manager 424, and a server storage manager 426 (comprising a server font repository 434, server font characteristics database 436, and font utilization database 438).

As just mentioned, and as illustrated in FIG. 4, the digital font selection system implemented by the client device 402 includes the user input detector 406. The user input detector 406 detects, identifies, monitors, receives, processes, captures, and/or records various types of user input. For example, the user input detector 406 detects one or more user interactions with respect to a user interface. As referred to herein, a "user interaction" refers to conduct performed by a user (or a lack of conduct performed by a user) to control the function of a computing device. "User input," as used herein, refers to input data generated in response to a user interaction.

The user input detector 406 operates in conjunction with any number of user input devices or computing devices (in isolation or in combination), including personal computers, laptops, smartphones, smart watches, tablets, touchscreen devices, televisions, personal digital assistants, mouse devices, keyboards, track pads, or stylus devices. The user input detector 406 detects and identifies various types of user interactions with user input devices, such as select events, drag events, scroll events, and so forth. For example, in the event the client device 402 includes a touch screen, the user input detector 406 detects one or more touch gestures (e.g., swipe gestures, tap gestures, pinch gestures, or reverse pinch gestures) from a user that forms a user interaction.

The user input detector 406 communicates with, and thus detects user input with respect to a variety of programs, applications, plug-ins, operating systems, user interfaces, or other implementations in software or hardware. For example, the user input detector 406 can recognize user input provided in conjunction with the electronic document application 410.

As just mentioned, and as illustrated in FIG. 4, the portion of the digital font selection system implemented by the client device 402 also includes the user interface manager 408. The user interface manager 408 provides, manages, and/or controls a graphical user interface (or simply "user interface") for use with the digital selection system 400. In particular, the user interface manager 408 can facilitate presentation of information by way of an external component of the client device 402. For example, the user interface manager 408 can display a user interface by way of a display screen associated with the client device 402. The user interface may be composed of a plurality of graphical components, objects, and/or elements that allow a user to perform a function. The user interface manager 408 presents, via the client device 402, a variety of types of information, including text, images, video, audio, characters, or other information. Moreover, the user interface manager 408 provides a variety of user interfaces specific to any variety of functions, programs, applications, plug-ins, devices, operating systems, and/or components of the client device 402 (e.g., the user interface 104).

The user interface manager 408 can provide a user interface with regard to a variety of operations or applications (e.g., the electronic document application 410). For example, the user interface manager 408 provides a user interface that facilitates creating, editing, modifying, storing, uploading, and managing electronic documents. Similarly, the user interface manager 408 can generate a user interface that facilitates utilizing, managing, applying, recommending, or downloading digital fonts. Additional details with respect to various example user interface elements are described throughout with regard to various embodiments containing user interfaces.

Moreover, as shown in FIG. 4, the portion of the digital font selection system implemented by the client device 402 also includes the electronic document application 410. The electronic document application 410 can generate, create, modify, edit, and/or manage one or more electronic documents. In particular, the electronic document application 410 can create an electronic document with one or more text elements comprising digital text with one or more digital fonts.

The electronic document application 410 can comprise any application that generates or modifies electronic documents. For example, in one or more embodiments, the electronic document application 410 comprises ADOBE® COMP® or ADOBE® INDESIGN®. Moreover, in one or more embodiments, the electronic document application 410 is implemented by a web browser communicating with a remote server (e.g., the server 404) hosting a website with additional software for creating or editing electronic documents.

The electronic document application 410 utilizes digital fonts (e.g., via the digital font manager 312 and/or local font repository 428). For example, the electronic document application 410 generates a text section with digital text utilizing one or more digital fonts.

The electronic document application 410 also renders (e.g., via the user interface manager 408) visual representations. For instance, the electronic document application 410 renders visual representations of one or more electronic documents, textual elements, recommendations, or digital fonts.

In addition to the electronic document application 410, as shown in FIG. 4, the portion of the digital font selection system implemented by the client device 402 may also include the digital font manager 412. The digital font manager 412 determines, analyzes, identifies, and/or detects one or more digital fonts. In particular, the digital font manager 412 determines, analyzes, identifies and/or detects one or more font characteristics corresponding to one or more digital fonts.

For example, the digital font manager 412 detects a digital font in an electronic document and identifies a title associated with the digital font. Moreover, the digital font manager 412 identifies font characteristics corresponding to the digital font. In particular, the digital font manager 412 accesses and analyzes the font characteristic database 430 (and/or the server font characteristics database 436) to identify font characteristics corresponding to the digital font.

The digital font manager 412 can also receive, download, install, register, and/or apply (e.g., via the electronic document application 410) one or more digital fonts. For example, digital font manager 412 receives a digital font (e.g., from the download manager 424) and installs and registers the digital font on the client device 402. Moreover, the digital font manager 412 provides access to the digital font to the electronic document application 410 for use with regard to digital text in an electronic document.

As illustrated in FIG. 4, in addition to the digital font manager 412, the portion of the digital font selection system implemented by the client device 402 can also include the text structure engine 414. The text structure engine 414 detects, determines, identifies, predicts, and/or estimates a text structure. For example, the text structure engine 414 detects digital text and identifies a text structure corresponding to the digital text.

The text structure engine 414 identifies a text structure corresponding to digital text by determining a variety of text characteristics. For example, as described previously, the text structure engine 414 determines a text size, a number of text lines, a size of a bounding box corresponding to digital text, a number of sentences, a number of words, or other characteristics of digital text. The text structure engine 414 utilizes these text characteristics to determine a text structure. For example, the text structure engine 414 determines that a small digital text with multiple sentences spanning multiple lines corresponds to a paragraph text structure. Similarly, the text structure engine 414 determines that a large digital text with a single sentence spanning a single line corresponds to a heading text structure.

In addition to determining a text structure with regard to existing digital text, the text structure engine 414 also estimates or anticipates one or more text structures with regard to an electronic document. Specifically, the text structure engine 414 generates, creates, estimates, and/or applies a formatting model with regard to an electronic document. For example, the text structure engine 414 can estimate, anticipate, or predict that an electronic document will utilize three heading text structures, two paragraph text structures, and a caption text structure. Moreover, the text structure engine 414 can provide the formatting model to the search facility 416 and the recommendation manager 418 for identifying and suggesting additional digital fonts.

The text structure engine 414 can generate or identify a formatting model based on characteristics of an electronic document. For instance, as previously described, the text structure engine 414 can determine a type of electronic document, a number of digital elements, a type of digital elements, a configuration of digital elements, or other characteristics of an electronic document. Moreover, the text structure engine 414 can generate a formatting model based on the determined characteristics.

As shown in FIG. 4, the portion of the digital font selection system implemented by the client device 402 also includes the search facility 416. The search facility 416 generates, creates, determines, applies, and/or utilizes one or more search queries. In particular, the search facility 416 generates a search query and utilizes the search query to identify digital fonts.

The search facility 416 generates any type or variety of search queries. For example, the search facility 416 generates a search query based on one or more font characteristics. In particular, the search facility 416 receives one or more font characteristics from the digital font manager 412 and generates a search query based on the received font characteristics.

The search facility 416 generates a search query that mirrors (e.g., duplicates) font characteristics of existing digital text. The search facility 416 can also generate a search query that is based on, but different than, font characteristics of existing digital text. For example, the search facility 416 modifies one or more font characteristics of digital text in generating a search query to identify a variety of digital fonts with slightly different styles or features.

The search facility 416 generates a search query based on a variety of factors. As described above, the search facility 416 can generate a search query based on previous utilization of digital fonts by the client device 402 or other client devices. For example, in one or more embodiments the search facility 416 receives information regarding font utilization (e.g., from the font utilization database 438), analyzes information regarding font utilization, and generates a search query based on the analyzed information. For instance, the search facility 416 determines that digital font with a first set of font characteristics are frequently utilized with digital fonts having a second set of font characteristics. Accordingly, upon identifying (e.g., via the digital font manager 412) a digital font with the first set of font characteristics, the search facility 416 generates a search query utilizing the second set of font characteristics.

The search facility 416 also applies a search query. For example, in one or more embodiments, the search facility 416 applies a search query to a database of digital fonts (e.g., the font characteristic database 430 and/or the server font characteristic database 436). In one or more embodiments, the search facility 416 applies a search query as a filter to identify digital fonts that correspond to search parameters.

The search facility 416 can also rank digital fonts resulting from a search. The search facility 416 can rank based on a variety of factors. For example, the search facility 416 ranks resulting digital fonts based on popularity, likelihood of use, a degree of correspondence to an existing digital font, or some other factor.

In one or more embodiments, the search facility 416 modifies a search query based on the search results. For example, the search facility 416 applies stricter search parameters if the number of search results exceeds a threshold number. Similarly, the search facility 416 can apply less strict search parameters if the number of search results falls below a threshold number.

As described previously (e.g., in relation to FIG. 3), in one or more embodiments, all, or a portion of the search facility 416, may be implemented on the server 404. For example, in one or more embodiments, the server 404 utilizes the search facility 416 to identify additional digital fonts and sends the additional digital fonts to the client device 402.

As illustrated in FIG. 4, the portion of the digital font selection system implemented by the client device 402 also includes the recommendation manager 418. The recommendation manager 418 suggests, recommends, provides, and/or indicates a subset of/complementary digital fonts. In particular, the recommendation manager 418 generates or accesses one or more visual representations of a digital font to provide for display via the client device 402.

For example, in one or more embodiments, the recommendation manager 418 receives a plurality of additional digital fonts (e.g., from the search facility 416). Moreover, the recommendation manager 418 generates a plurality of visual representations of digital fonts and renders the indications via the client device 402 (e.g., via the electronic document application 410 and the user interface manager 408).

The recommendation manager 418 organizes suggested digital fonts based on a formatting model. For example, the recommendation manager 418 receives (from the text structure engine 414) a formatting model comprising a plurality of anticipated text structures with regard to an electronic document. Moreover, the recommendation manager 418 receives a plurality of additional digital fonts (e.g., from the search facility 416). The recommendation manager 418 generates a plurality of visual representations organized based on the formatting model applicable to the electronic document.

As shown in FIG. 4, the portion of the digital font selection system implemented by the client device also includes the device storage manager 420. The device storage manager 420 maintains data for the digital selection system 400. The device storage manager 420 maintains data as necessary to perform the functions of the digital selection system 400. As illustrated, the device storage manager 420 includes the local font repository 428. The local font repository 428 includes one or more digital fonts installed on the client device 402.

In addition, the device storage manager 420 also includes the font characteristics database 430. The font characteristics database 430 includes data (e.g., metadata) associating digital fonts to one or more font characteristics. For example, the font characteristics database 430 includes a database defining font characteristics applicable to a plurality of digital fonts. The client device 402 can utilize the database, for example, to search for additional digital fonts.

Moreover, as illustrated in FIG. 4, the device storage manager 420 also includes profile data 432. Profile data 432 includes information regarding the client device 402 and/or one or more users of the client device. Profile data 432 includes information regarding prior utilization of digital fonts, font characteristics, and/or electronic documents (e.g., user history). Similarly, profile data 432 includes information regarding user preferences (e.g. preferences regarding particular digital fonts or font characteristics). Profile data 432 also includes information regard the client device 402 (e.g., type of device, operating system, installed applications, etc.) and the users of the client device 402 (e.g., name, contact information, demographic information, or purchase history). The digital selection system 400 can utilize any of the profile data 432 to search for or suggest additional digital fonts.

As mentioned above, in addition to the client device 402, at least a portion of the digital selection system 400 can be implemented by the server 404. As illustrated in FIG. 4, the portion of the digital font selection system implemented by the server 404 includes the font facility 422. The font facility 422 assists in identifying, suggesting, or searching for one or more digital fonts. In particular, the font facility 422 provides information regarding one or more digital fonts (e.g., from the server font repository 434, the server font characteristics database 436, or the font utilization database 438) to the client device 402.

For example, as described above, the search facility 416 may generate a search query based on font utilization with regard to other users and/or computing devices. The font facility 422 provides information regarding font utilization (e.g., via the font utilization database 438). Additionally, in one or more embodiments, the font facility 422 generates a search query and sends the search query (or the search results) to the search facility 416.

The font facility 422 can also receive, analyze, and manage utilization of digital fonts. For example, the font facility 422 receives (e.g., from the client device 402 and the profile data 432) data indicating the digital fonts selected and/or utilized with regard electronic documents. The font facility 422 can also receive similar data from other computing devices. The font facility 422 can track, update, analyze, and manage (e.g., via the font utilization database 438) information regarding utilization of digital fonts with regard to a plurality of computing devices.

The font facility 422 can also receive, analyze, and manage, a plurality of digital fonts (e.g., via the server font repository 434). For example, the font facility 422 dynamically gathers, collects, and/or receives digital fonts from a plurality of sources, including third-party remote servers. The font facility 422 analyzes digital fonts and determines one or more font characteristics applicable to the digital font. Moreover, the font facility 422 can dynamically update, modify, and remove digital fonts and/or corresponding font characteristics as fonts are received, modified, and/or removed.

In addition to the font facility 422, the portion of the digital font selection system implemented by the server 404 also includes the download manager 424. The download manager 424 provides, sends, or downloads one or more digital fonts to the client device 402. For example, the download manager 424 receives (e.g., from the digital font manager 412 or the electronic document application 410) a request for an additional digital font that is not installed on the client device 402. The download manager 424 accesses the requested digital font (e.g., via the server font repository 434) and provides the requested digital font to the client device 402.

In addition, as illustrated in FIG. 4, the portion of the digital font selection system implemented by the server 404 also includes the server storage manager 426. The server storage manager 426 maintains data for the digital selection system 400. The server storage manager 426 maintains data as necessary to perform the functions of the digital selection system 400. As illustrated, the server storage manager 930 includes the server font repository 434. The server font repository 434 includes information regarding a plurality of digital fonts. For example, the server font repository 434 includes a plurality of digital font files that can be downloaded, installed, and registered to one or more computing devices.

In addition, the server storage manager 426 also includes the server font characteristics database 436. The server font characteristics database 436 includes information (e.g., metadata) associating font characteristics to the plurality of digital fonts. For example, the server font characteristics database 436 includes a database defining font characteristics applicable to a plurality of digital fonts.

As illustrated in FIG. 4, the server storage manager 426 also includes the font utilization database 438. The font utilization database 438 includes data regarding how digital fonts are utilized within electronic documents. In particular, the font utilization database 438 includes information regarding utilization of digital fonts from a plurality of computing devices. The font utilization database 438 includes information regarding frequency that digital fonts are utilized, what digital fonts are utilized in conjunction with other digital fonts, what font characteristics are utilized with other font characteristics, and other utilization information.

Each of the components 406-426 of the digital selection system 400 and their corresponding elements (as shown in FIG. 4) may be in communication with one another using any suitable communication technologies. It will be recognized that although components 406-426 of the digital selection system 400 and their corresponding elements are shown to be separate in FIG. 4, any of components 406-426 and their corresponding elements may be combined into fewer components, such as into a single facility or module, divided into more components, or configured into different components as may serve a particular embodiment.

The components 406-426 of the digital selection system 400 and their corresponding elements can comprise software, hardware, or both. For example, the components 406-426 and their corresponding elements can comprise one or more instructions stored on a computer-readable storage medium and executable by processors of one or more computing devices. When executed by the one or more processors, the computer-executable instructions of the digital selection system 400 can cause a client device and/or a server device to perform the methods described herein. Alternatively, the components 406-426 and their corresponding elements can comprise hardware, such as a special purpose processing device to perform a certain function or group of functions. Additionally or alternatively, the components 406-426 and their corresponding elements can comprise a combination of computer-executable instructions and hardware.

Furthermore, the components 406-426 may, for example, be implemented as one or more operating systems, as one or more stand-alone applications, as one or more modules of an application, as one or more plug-ins, as one or more library functions or functions that may be called by other applications, and/or as a cloud-computing model. Thus, the components 406-426 may be implemented as a stand-alone application, such as a desktop or mobile application. Furthermore, the components 406-426 may be implemented as one or more web-based applications hosted on a remote server. Alternatively or additionally, the components 406-426 may be implemented in a suit of mobile device applications or "apps." To illustrate, the components 406-426 may be implemented in an application, including but not limited to ADOBE® COMP®, ADOBE® TYPEKIT®, ADOBE® CREATIVE® CLOUD®, ADOBE® DOCUMENT CLOUD®, ADOBE® ACROBAT®, ADOBE® ILLUSTRATOR®, ADOBE® INDESIGN®, or ADOBE® PHOTOSHOP®. "ADOBE," "COMP," "TYPEKIT," "CREATIVE CLOUD," "DOCUMENT CLOUD," "ACROBAT," "ILLUSTRATOR," "INDESIGN," and "PHOTOSHOP" are either registered trademarks or trademarks of Adobe Systems Incorporated in the United States and/or other countries.

Figure 5:
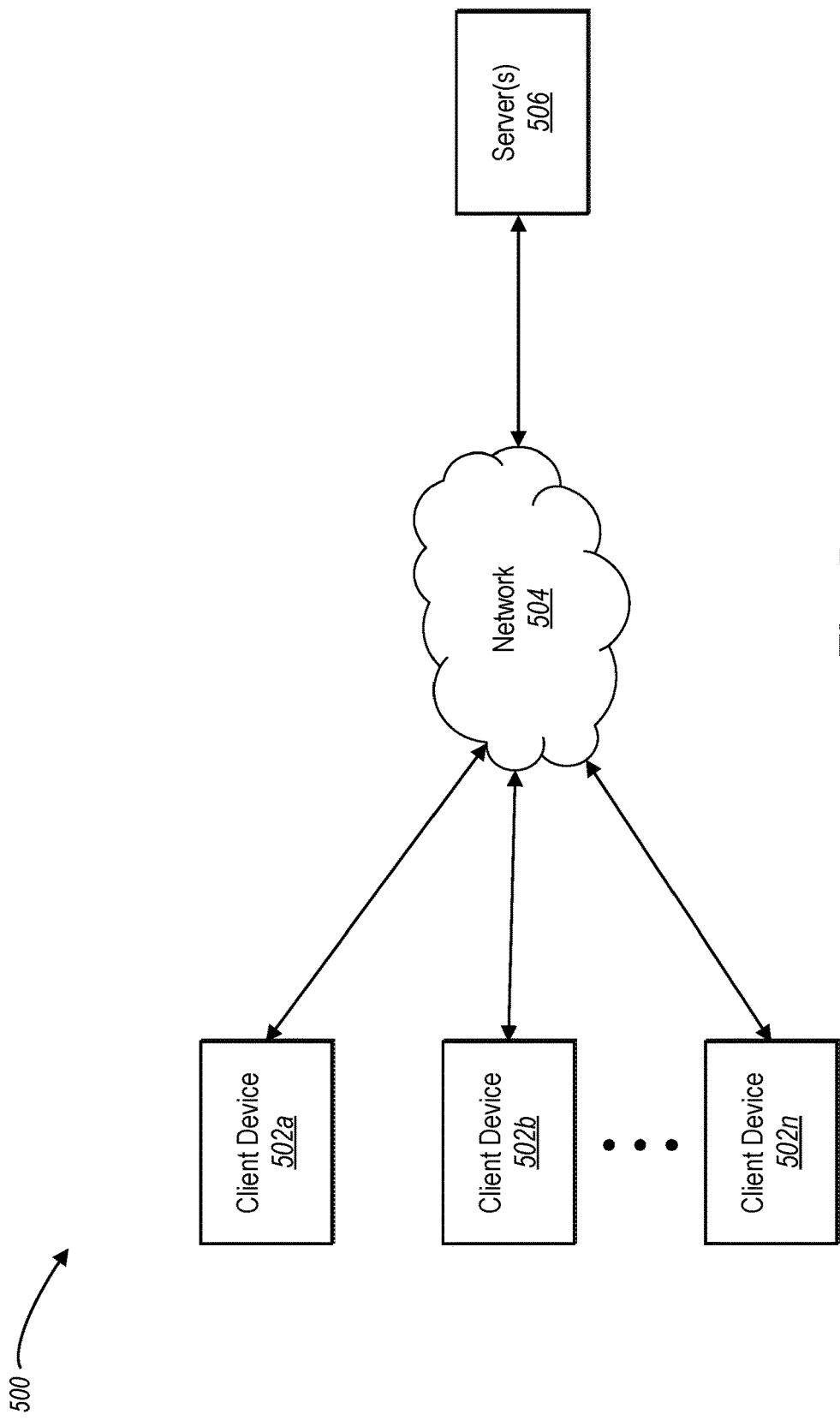
FIG. 5 illustrates a schematic diagram of an exemplary environment in which the digital font selection system can operate in accordance with one or more embodiments.

FIG. 5 illustrates a schematic diagram of one embodiment of an exemplary environment 500 in which the digital selection system 400 can operate. In one or more embodiments, the exemplary environment 500 includes one or more client devices 502a, 502b, . . . 502n, a network 504, and server(s) 506. The network 504 may be any suitable network over which the computing devices can communicate. Example networks are discussed in more detail below with regard to FIG. 9.

As illustrated in FIG. 5, the environment 500 may include client devices 502a-502n. The client devices 502a-502n may comprise any computing device. For example, client devices 502a-502n may comprise one or more personal computers, laptop computers, mobile devices, mobile phones, tablets, special purpose computers, televisions, or other computing devices, including computing devices described below with regard to FIG. 9. For instance, in one or more embodiments, one or more of the client devices 502a-502n comprise the client device 402 implementing the digital selection system 400.

In addition, the environment 500 may also include the server(s) 506. The server(s) 506 may generate, store, receive, and transmit any type of data, including the server font repository 434, the server font characteristics database 436, and the font utilization database 438. For example, the server(s) 506 may transmit data to a client device, such as the client device 502a. The server(s) 506 can also transmit electronic messages between one or more users of the environment 500. In one example embodiment, the server(s) 506 comprise a content server. The server(s) 506 can also comprise a communication server or a web-hosting server. Additional details regarding the server(s) 506 will be discussed below with respect to FIG. 9.

As illustrated, in one or more embodiments, the server(s) 506 can include the digital selection system 400. In particular, the digital selection system 400 can comprise an application running on the server(s) 506 or a portion of a software application that can be downloaded from the server(s) 506. For example, the digital selection system 400 can include a web hosting application that allows the client devices 502a-502n to interact with content hosted at the server(s) 506. To illustrate, in one or more embodiments of the exemplary environment 500, one or more client devices 502a-502n can access a webpage supported by the server(s) 506. In particular, the client device 502a can run a web application (e.g., a web browser) to allow a user to access, view, and/or interact with a webpage or website hosted at the server(s) 506.

Although FIG. 5 illustrates a particular arrangement of the client devices 502a-502n, the network 504, and the server(s) 506, various additional arrangements are possible. For example, while FIG. 5 illustrates multiple separate client devices 502a-502n communicating with the server(s) 506 via the network 504, in one or more embodiments a single client device may communicate directly with the server(s) 506, bypassing the network 504.

Similarly, although the environment 500 of FIG. 5 is depicted as having various components, the environment 500 may have additional or alternative components. For example, the digital selection system 400 can be implemented on a single computing device. In particular, the digital selection system 400 may be implemented in whole by the client device 502a (e.g., the client device 502a may comprise the client device 402) or the digital selection system 400 may be implemented in whole by the server(s) 506. Alternatively, the digital selection system 400 may be implemented across multiple devices or components (e.g., utilizing the client devices 502a-502n and the server(s) 506, as illustrated with regard to FIG. 4).

By way of example, in one or more embodiments, the client device 502 generates an electronic document (e.g., via the electronic document application 410) comprising digital text with a first digital font. The client device 502 detects the first digital font and a plurality of font characteristics (e.g., via the digital font manager 412). Moreover, the client device 502 determines a text structure corresponding to the digital text (e.g., via the text structure engine 414). The client device 502 generates a search query based on the detected font characteristics and the determined text structure and applies the search query to a database of digital fonts on the client device 502 (e.g., via the search facility 416 and/or the font facility 422 in conjunction with the font characteristics database 430 and/or the server font characteristics database 436). The client device 502 identifies a plurality of additional digital fonts complementary to the first digital font and renders a visual representation of the additional digital fonts (e.g., via the recommendation manager 418 and the electronic document application 410). The client device 502 receives user input of a selection of one of the additional digital fonts (e.g., via the user input detector 406) and sends a request to the server(s) 506 to download the selected digital font. The server(s) 506 download the selected digital font to the client device 502 (e.g., via the download manager 424). The client device 502 installs the selected digital font and utilizes the selected digital font with regard to additional digital text in the electronic document.

The server(s) 506 can also receive, collect, and manage information from a plurality of client devices. For example, in one or more embodiments, the server(s) 506 receive and manage information regarding utilization of digital fonts from the client devices 502a-502n. The server(s) 506 can utilize the information to suggest additional digital fonts to the client device 502a (e.g., via the font facility 422).

Figure 6:
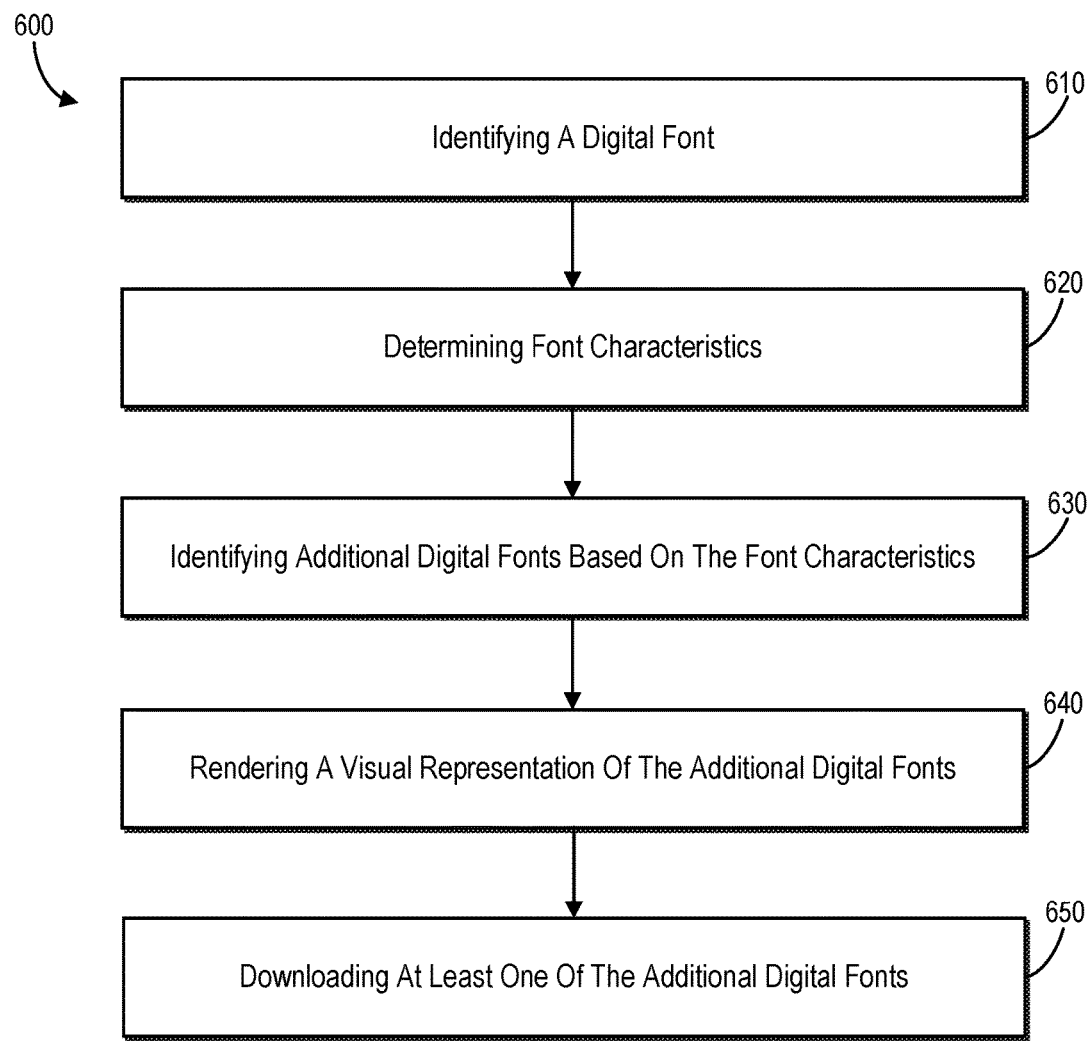
FIG. 6 illustrates a flowchart of a series of acts in a method of identifying complementary texts in accordance with one or more embodiments.
Figure 7:
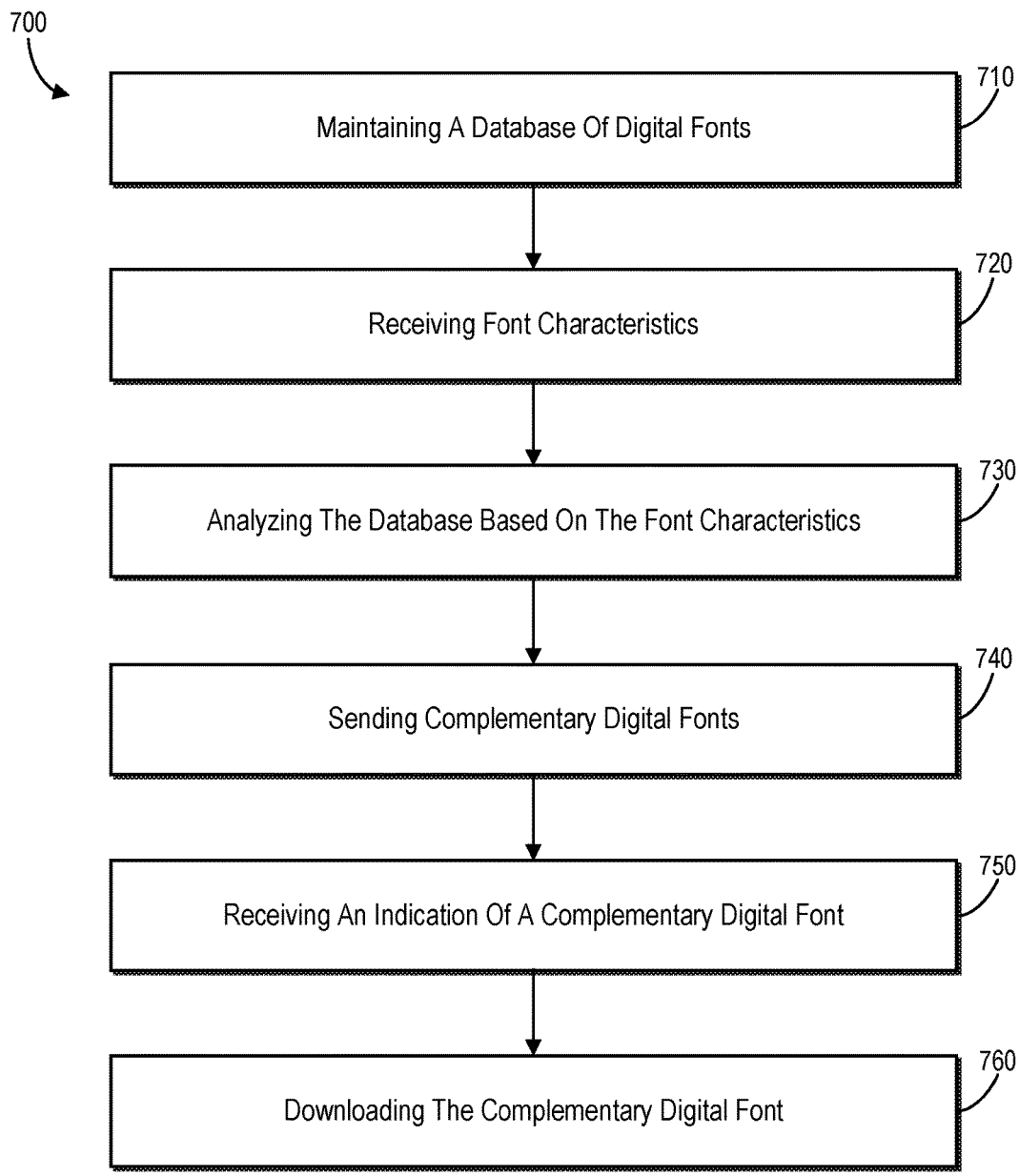
FIG. 7 illustrates a flowchart of a series of acts in another method of identifying complementary texts in accordance with one or more embodiments.
Figure 8:
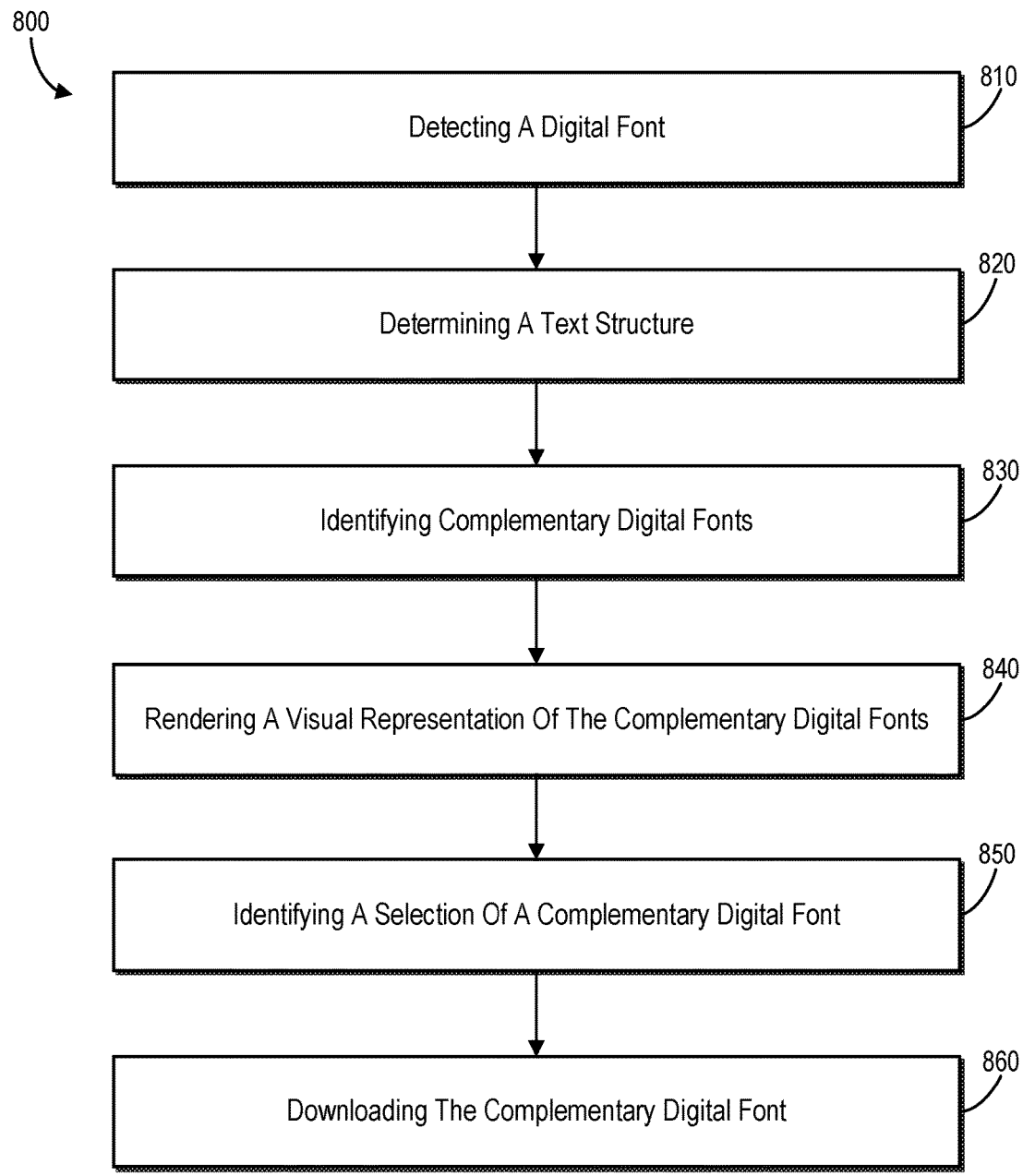
FIG. 8 illustrates flowchart of a series of acts in yet another method of identifying complementary texts in accordance with one or more embodiments.

FIGS. 1-5, the corresponding text, and the examples, provide a number of different systems and devices that suggest digital fonts. In addition to the foregoing, embodiments can also be described in terms of flowcharts comprising acts and steps in a method for accomplishing a particular result. For example, FIGS. 6-8 illustrate flowcharts of exemplary methods in accordance with one or more embodiments. The methods described in relation to FIGS. 6-8 may be performed with less or more steps/acts or the steps/acts may be performed in differing orders. Additionally, the steps/acts described herein may be repeated or performed in parallel with one another or in parallel with different instances of the same or similar steps/acts.

FIG. 6 illustrates a flowchart of a series of acts in a method 600 of suggesting digital fonts in accordance with one or more embodiments. In one or more embodiments, the method 600 is performed in a digital medium environment that includes the digital selection system 400. The method 600 is intended to be illustrative of one or more methods in accordance with the present disclosure, and is not intended to limit potential embodiments. Alternative embodiments can include additional, fewer, or different steps than those articulated in FIG. 6.

As illustrated in FIG. 6 the method 600 includes an act 610 of identifying a digital font. In particular, the act 610 includes identifying, by at least one processor of the mobile device, a digital font of a portion of digital text in an electronic document rendered on the mobile device. For example, the act 610 can include identifying a digital font from metadata corresponding to an electronic document.

In addition, as illustrated in FIG. 6, the method 600 also includes an act 620 of determining font characteristics. In particular, the act 620 includes determining, by the at least one processor, one or more font characteristics of the digital font of the portion of digital text in the electronic document rendered on the mobile device. For instance, in one or more embodiments, font characteristics comprise at least one of: a font classification, a weight, a width, an x-height, a contrast, or a capitalization style. The act 620 can include determining the one or more font characteristics from a remote server (e.g., by sending an indication of the digital font to the remote server and receiving one or more font characteristics from the remote server).

Moreover, as shown in FIG. 6, the method 600 also includes the act 630 of identifying additional digital fonts based on the font characteristics. In particular, the act 630 includes identifying, by the at least one processor, a subset of digital fonts that are complementary to the digital font from a plurality of digital fonts stored on a remote server based on the determined one or more font characteristics of the digital font and metadata corresponding to the plurality of digital fonts stored on the remote server. For instance, the act 630 can include generating a search query based on the one or more font characteristics (e.g., where the search query parameters are the font characteristics or where the search query parameters are modified based on the font characteristics) and searching a database of digital fonts based on the search query As shown in FIG. 6, the method 600 also includes act 640 of rendering a visual representation of the additional digital fonts. In particular, the act 640 includes rendering, by the mobile device, a visual representation of the subset of digital fonts complementary to the digital font for selection.

As illustrated in FIG. 6, the method 600 also includes an act 650 of downloading at least one of the additional digital fonts. In particular, the act 650 can include based on a user interaction with the visual representation of a complementary font of the subset of digital fonts stored on the remote server, downloading the complementary font to the mobile device from the remote server.

The method 600 can also include determining a text structure. For instance, in one or more embodiments, the method 600 includes determining a text structure corresponding to the digital text based on at least one of: a size of the digital text, a size of a bounding box corresponding to the digital text, or a number of lines of the digital text; and identifying the subset of digital fonts based on the determined text structure of the digital text in the electronic document rendered on the mobile device. For instance, in one or more embodiments, determining the text structure comprises identifying the text structure from a plurality of text structures wherein the plurality of text categories comprise at least one of: a heading text structure, a paragraph text structure, or a caption text structure.

Furthermore, in one or more embodiments, wherein identifying the subset of digital fonts based on the text structure further comprises: searching a database comprising the plurality of digital fonts for digital fonts corresponding to the text structure and the one or more font characteristics, wherein the database associates each of the plurality of digital fonts with a corresponding text structure and font characteristics. Moreover, identifying the subset of digital fonts based on the text structure further comprises: generating a formatting model with regard to the electronic document, the formatting model comprising a plurality of text structures; determining that the text structure corresponds to one of the plurality of text structures; and searching the database of the plurality of digital fonts for digital fonts corresponding to the remaining plurality of text structures that do not correspond to the text structure The method 600 can also include receiving, from the remote server, the metadata corresponding to the plurality of digital fonts stored on the remote server without receiving the plurality of digital fonts; utilizing metadata corresponding to the digital text to identify the one or more font characteristics; and identifying the subset of digital fonts by comparing the one or more font characteristics to the metadata corresponding to the plurality of digital fonts.

In addition, in one or more embodiments, the method 600 includes identifying a second digital font applied to a second portion of digital text in the electronic document rendered on the mobile device; and determining, by the at least one processor, a second set of one or more font characteristics of the second digital font of the second portion of digital text in the electronic document rendered on the mobile device; and wherein identifying the subset of digital fonts comprises identifying a subset of digital fonts based on the second digital font and the second set of one or more font characteristics.

In addition, FIG. 7 illustrates another flowchart of a series of acts in a method 700 of suggesting digital fonts in accordance with one or more embodiments. As shown, the method 700 can include an act 710 of maintaining a database of digital fonts. In particular, the act 710 includes maintaining a database comprising a plurality of digital fonts each with associated font characteristics.

In addition, as shown in FIG. 7, the method 700 can also include an act 720 of receiving font characteristics. In particular, the act 720 includes receiving an indication of a set of font characteristics of a digital font of digital text in an electronic document at a computing device. For instance, in one or more embodiments, the set of font characteristics comprises at least one of: a font classification, a weight, a width, an x-height, a contrast, or a capitalization style. Moreover, in one or more embodiments, the act 720 includes receiving, from a mobile device, an indication of a digital font and identifying a set of font characteristics based on the indication of the digital font.

As shown in FIG. 7, the method 700 also includes an act 730 of analyzing the database based on the font characteristics. For example, the act 730 includes analyzing the database of digital fonts based on the set of font characteristics to identify, from the plurality of digital fonts, a subset of digital fonts that are complementary to the digital font. For instance, in one or more embodiments, the act 730 includes searching the database of digital fonts utilizing a search query based on the set of font characteristics.

Furthermore, as illustrated in FIG. 7, the method 700 also includes an act 740 of sending complementary digital fonts. For instance, the act 740 includes sending metadata for the identified subset of complementary digital fonts to the computing device without sending the complementary digital fonts.

Moreover, as shown in FIG. 7, the method 700 also includes an act 750 of receiving a complementary digital font. In particular, the act 750 includes receiving, from the computing device, an indication of a complementary digital font selected at the computing device.

As shown in FIG. 7, the method 700 also includes an act 760 of downloading the selected, complementary digital font. For instance, the act 760 includes downloading to the computing device the selected complementary digital font.

The method 700 can also include identifying a text structure corresponding to the digital text in the electronic document based on at least one of: a size of the digital text, a size of a bounding box corresponding to the digital font, or a number of lines of the digital text. For instance, in one or more embodiments, the method 700 includes identifying the text structure from a plurality of text structures wherein the plurality of text structures comprise at least one of: a paragraph text structure, a heading text structure, or a caption text structure. Moreover, the method 700 can include identifying the subset of complementary digital fonts based on the text structure by searching the database comprising the plurality of digital fonts for digital fonts corresponding to the text structure and the one or more font characteristics, wherein the database associates each of the plurality of digital fonts with a corresponding text structure and font characteristics.

The method 700 can also include identifying a second digital font applied to a second digital text in the electronic document, the second digital font comprising a second set of font characteristics; and analyzing the database of digital fonts based on the set of font characteristics and the second set of font characteristics to identify the subset of complementary digital fonts.

In addition, FIG. 8 illustrates another flowchart of a series of acts in a method 800 of suggesting digital fonts in accordance with one or more embodiments. As shown, the method 800 can include an act 810 of detecting a digital font. In particular, the act 810 includes detecting, by at least one processor, a digital font applied to digital text in an electronic document rendered on a computing device.

In addition, as shown in FIG. 8, the method 800 includes an act 820 of determining a text structure. In particular, the act 820 includes determining, by the at least one processor, a text structure corresponding to a use of the digital text in the electronic document based on: a size of the digital font applied to the digital text, a size of a bounding box corresponding to the digital text, and a number of lines of the digital text.

As shown in FIG. 8, the method 800 also includes an act 830 of identifying complementary digital fonts. For example, the act 830 includes, based on the digital font and the text structure corresponding to the use of the digital text in the electronic document, identifying, from a plurality of digital fonts on a remote server, a subset of digital fonts complementary to the digital font.

Furthermore, as shown in FIG. 8, the method 800 can also include an act 840 of rendering a visual representation of the complementary digital fonts. In particular, the act 840 includes rendering a visual representation of the subset of digital fonts complementary to the digital font via a display screen of the computing device.

As illustrated in FIG. 8, the method 800 can also include an act 850 of identifying a selection of a complementary digital font. In particular, the act 850 includes identifying a selection of a complementary digital font from the subset of digital fonts. More particularly, in one or more embodiments, the act 850 includes receiving user input of a selection of a visual representation of a complementary digital font (e.g., at a mobile device).

Furthermore, as shown, the method 800 can also include an act 860 of downloading the complementary digital font. In particular, the act 860 includes downloading, from the remote server, the complementary digital font to the computing device in response to the selection of the complementary digital font. For instance, the act 860 can include installing and registering the complementary digital font to a mobile device in response to the selection of the complementary digital font. In addition, the act 860 can include applying the downloaded complementary digital font to digital text in the electronic document.

The method 800 can also include detecting a second digital font applied to a second digital text in the electronic document; and based on the digital font and the second digital font, identifying the subset of digital fonts. Moreover, the method 800 can also include determining a second text structure corresponding to a use of the second digital text in the electronic document; and based on the text structure and the second text structure, identifying the subset of digital fonts.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 9:
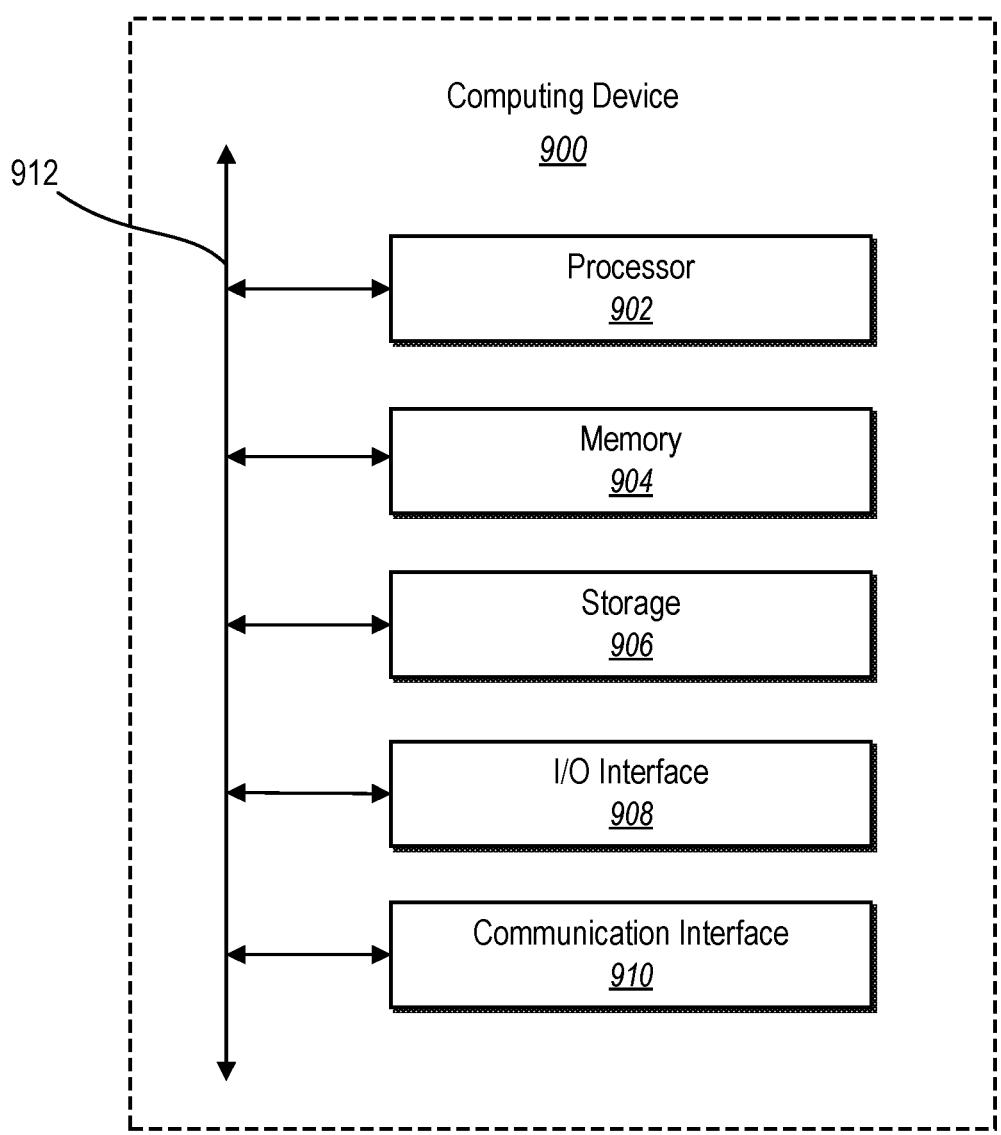
FIG. 9 illustrates a block diagram of an exemplary computing device in accordance with one or more embodiments.

FIG. 9 illustrates, in block diagram form, an exemplary computing device 900 that may be configured to perform one or more of the processes described above. One will appreciate that the digital selection system 400 can comprise implementations of the computing device 900. As shown by FIG. 9, the computing device can comprise a processor 902, memory 904, a storage device 906, an I/O interface 908, and a communication interface 910. In certain embodiments, the computing device 900 can include fewer or more components than those shown in FIG. 9. Components of computing device 900 shown in FIG. 9 will now be described in additional detail.

In particular embodiments, processor(s) 902 includes hardware for executing instructions, such as those making up a computer program. As an example and not by way of limitation, to execute instructions, processor(s) 902 may retrieve (or fetch) the instructions from an internal register, an internal cache, memory 904, or a storage device 906 and decode and execute them.

The computing device 900 includes memory 904, which is coupled to the processor(s) 902. The memory 904 may be used for storing data, metadata, and programs for execution by the processor(s). The memory 904 may include one or more of volatile and non-volatile memories, such as Random Access Memory ("RAM"), Read Only Memory ("ROM"), a solid state disk ("SSD"), Flash, Phase Change Memory ("PCM"), or other types of data storage. The memory 904 may be internal or distributed memory.

The computing device 900 includes a storage device 906 includes storage for storing data or instructions. As an example and not by way of limitation, storage device 906 can comprise a non-transitory storage medium described above. The storage device 906 may include a hard disk drive (HDD), flash memory, a Universal Serial Bus (USB) drive or a combination of these or other storage devices.

The computing device 900 also includes one or more input or output ("I/O") devices/interfaces 908, which are provided to allow a user to provide input to (such as user strokes), receive output from, and otherwise transfer data to and from the computing device 900. These I/O devices/interfaces 908 may include a mouse, keypad or a keyboard, a touch screen, camera, optical scanner, network interface, modem, other known I/O devices or a combination of such I/O devices/interfaces 908. The touch screen may be activated with a stylus or a finger.

The I/O devices/interfaces 908 may include one or more devices for presenting output to a user, including, but not limited to, a graphics engine, a display (e.g., a display screen), one or more output drivers (e.g., display drivers), one or more audio speakers, and one or more audio drivers. In certain embodiments, devices/interfaces 908 is configured to provide graphical data to a display for presentation to a user. The graphical data may be representative of one or more graphical user interfaces and/or any other graphical content as may serve a particular implementation.

The computing device 900 can further include a communication interface 910. The communication interface 910 can include hardware, software, or both. The communication interface 910 can provide one or more interfaces for communication (such as, for example, packet-based communication) between the computing device and one or more other computing devices 900 or one or more networks. As an example and not by way of limitation, communication interface 910 may include a network interface controller (NIC) or network adapter for communicating with an Ethernet or other wire-based network or a wireless NIC (WNIC) or wireless adapter for communicating with a wireless network, such as a WI-FI.

The computing device 900 can further include a bus 912. The bus 912 can comprise hardware, software, or both that couples components of computing device 900 to each other.

In the foregoing specification, the invention has been described with reference to specific exemplary embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

We claim:

1. A non-transitory computer readable medium storing instructions thereon that, when executed by at least one processor, cause a computing device to:
    identify a digital font of digital text in an electronic document rendered on the computing device;
    determine one or more font characteristics of the digital font of the digital text in the electronic document rendered on the computing device;
    determine a heading text structure, a paragraph text structure, and a caption text structure corresponding to the electronic document;
    identify a first subset of digital fonts complementary to the digital font for the heading text structure, a second subset of digital fonts complementary to the digital font for the paragraph text structure, and a third subset of digital fonts complementary to the digital font for the caption text structure from a plurality of digital fonts stored on a remote server based on the one or more font characteristics of the digital font, the heading text structure, the paragraph text structure, and the caption text structure;
    render, by the computing device, a first set of visual representations of the first subset of digital fonts, a second set of visual representations of the second subset of digital fonts, and a third set of visual representations of the third subset of digital fonts, the first set of visual representations comprising preview glyphs portraying the first subset of digital fonts; and
    based on a user interaction with a visual representation of the first set of visual representations, the second set of visual representations, or the third set of visual representations, downloading at least one complementary font from the first subset of digital fonts, the second subset of digital fonts, or the third subset of digital fonts.

2. The non-transitory computer readable medium of claim 1, further comprising instructions that, when executed by the at least one processor, cause the computing device to:
    determine a second paragraph text structure corresponding to the electronic document; and
    identify a fourth subset of digital fonts complementary to the digital font for the second paragraph text structure.

3. The non-transitory computer readable medium of claim 1, further comprising instructions that, when executed by the at least one processor, cause the computing device to:
    determine a text structure corresponding to the digital text based on at least one of: a size of the digital text, a size of a bounding box corresponding to the digital text, or a number of lines of the digital text; and
    identify the first subset of digital fonts, the second subset of digital fonts, and the third subset of digital fonts-based on the text structure of the digital text in the electronic document rendered on the computing device.

4. The non-transitory computer readable medium of claim 3, wherein the text structure corresponding to the digital text in the electronic document comprises an existing paragraph text structure that includes the digital text.

5. The non-transitory computer readable medium of claim 4, further comprising instructions that, when executed by the at least one processor, cause the computing device to identify the second subset of digital fonts based on the text structure by: searching a database comprising the plurality of digital fonts for digital fonts corresponding to the text structure, the one or more font characteristics, and the paragraph text structure, wherein the database associates each of the plurality of digital fonts with a corresponding text structure and font characteristics.

6. The non-transitory computer readable medium of claim 3, further comprising instructions that, when executed by the at least one processor, cause the computing device to identify the first subset of digital fonts, the second subset of digital fonts, and the third subset of digital fonts by:
    generating a formatting model with regard to the electronic document, the formatting model comprising the heading text structure, the paragraph text structure, and the caption text structure; and
    in response to determining that the text structure corresponding to the digital text in the electronic document is different than the heading text structure, the paragraph text structure, and the caption text structure from the formatting model, searching a database comprising the plurality of digital fonts for digital fonts corresponding to the heading text structure, the paragraph text structure, and the caption text structure.

7. The non-transitory computer readable medium of claim 1, further comprising instructions that, when executed by the at least one processor, cause the computing device to:
    receive, from the remote server, metadata corresponding to the plurality of digital fonts stored on the remote server without receiving the plurality of digital fonts;
    utilize metadata corresponding to the digital text to identify the one or more font characteristics;
    identify the first subset of digital fonts, the second subset of digital fonts, and the third subset of digital fonts by comparing the one or more font characteristics to the metadata corresponding to the plurality of digital fonts; and
    generate the first set of visual representations, the second set of visual representations, and the third set of visual representations based on the metadata corresponding to the plurality of digital fonts.

8. The non-transitory computer readable medium of claim 1, further comprising instructions that, when executed by the at least one processor, cause the computing device to:
    identify a second digital font applied to a second digital text corresponding to a second text structure in the electronic document rendered on the computing device; and
    determine, by the at least one processor, a second set of one or more font characteristics of the second digital font of the second digital text in the electronic document rendered on the computing device; and
    identify the first subset of digital fonts based on the second digital font and the second set of one or more font characteristics and the second text structure.

9. A system comprising:

at least one processor; and at least one non-transitory computer readable storage medium storing instructions that, when executed by the at least one processor cause the system to:

maintain a database comprising a plurality of digital fonts each with associated font characteristics;

receive an indication of a set of font characteristics of a digital font of digital text in an electronic document at a computing device;

determine a heading text structure, a paragraph text structure, and a caption text structure corresponding to the electronic document;

analyze the database comprising the plurality of digital fonts based on the set of font characteristics to identify, from the plurality of digital fonts, a first subset of digital fonts complementary to the digital font for the heading text structure, a second subset of digital fonts complementary to the digital font for the paragraph text structure, and a third subset of digital fonts complementary to the digital font for the caption text structure;

provide, for display via the computing device, a first set of visual representations of the first subset of digital fonts, a second set of visual representations of the second subset of digital fonts, and a third set of visual representations of the third subset of digital fonts, the first set of visual representations comprising preview glyphs portraying the first subset of digital fonts; and in response to receiving, from the computing device, an indication of at least one complimentary digital font from the first subset of digital fonts, the second subset of digital fonts, or the third subset of digital fonts based on a user interaction with a visual representation of the first set of visual representations, the second set of visual representations, or the third set of visual representations, download to the computing device, the complementary digital font.

10. The system of claim 9, wherein the set of font characteristics comprises at least one of: a font classification, a weight, a width, an x-height, a contrast, or a capitalization style.

11. The system of claim 9, further comprising instructions that, when executed by the at least one processor, cause the system to identify a text structure corresponding to the digital text in the electronic document based on at least one of: a size of the digital text, a size of a bounding box corresponding to the digital font, or a number of lines of the digital text.

12. The system of claim 9, wherein the text structure corresponding to the digital text in the electronic document comprises an existing paragraph text structure that includes the digital text.

13. The system of claim 11, further comprising instructions that, when executed by the at least one processor, cause the system to identify the first subset of digital fonts based on the text structure by searching the database comprising the plurality of digital fonts for digital fonts corresponding to the text structure, the set of font characteristics, and the heading text structure, wherein the database associates each of the plurality of digital fonts with a corresponding text structure and font characteristics.

14. The system of claim 9, further comprising instructions that, when executed by the at least one processor, cause the system to:

determine a second paragraph text structure corresponding to the electronic document; and identify a fourth subset of digital fonts complementary to the digital font for the second paragraph text structure.

15. A computer-implemented method comprising:

identifying a digital font of digital text in an electronic document;

determining one or more font characteristics of the digital font of the digital text in the electronic document;

determining a heading text structure, a paragraph text structure, and a caption text structure corresponding to the electronic document;

identifying a first subset of digital fonts complementary to the digital font for the heading text structure, a second subset of digital fonts complementary to the digital font for the paragraph text structure, and a third subset of digital fonts complementary to the digital font for the caption text structure from a plurality of digital fonts stored on a remote server based on the one or more font characteristics of the digital font, the heading text structure, the paragraph text structure, and the caption text structure;

rendering a first set of visual representations of the first subset of digital fonts, a second set of visual representations of the second subset of digital fonts, and a third set of visual representations of the third subset of digital fonts, the first set of visual representations comprising preview glyphs portraying the first subset of digital fonts; and based on a user interaction with a visual representation of the first set of visual representations, the second set of visual representations, or the third set of visual representations, downloading at least one complementary font from the first subset of digital fonts, the second subset of digital fonts, or the third subset of digital fonts.

16. The method of claim 15, further comprising:

determining a second paragraph text structure corresponding to the electronic document; and identifying a fourth subset of digital fonts complementary to the digital font for the second paragraph text structure.

17. The method of claim 15, further comprising:

determining a text structure corresponding to the digital text based on at least one of: a size of the digital text, a size of a bounding box corresponding to the digital text, or a number of lines of the digital text; and identifying the first subset of digital fonts, the second subset of digital fonts, and the third subset of digital fonts based on the text structure of the digital text in the electronic document.

18. The method of claim 17, wherein the text structure corresponding to the digital text in the electronic document comprises an existing paragraph text structure that includes the digital text.

19. The method of claim 15, wherein identifying the second subset of digital fonts based on the text structure comprises: searching a database comprising the plurality of digital fonts for digital fonts corresponding to the text structure, the one or more font characteristics, and the paragraph text structure, wherein the database associates each of the plurality of digital fonts with a corresponding text structure and font characteristics.

20. The method of claim 15, further comprising:
identifying a second digital font applied to a second digital text corresponding to a second text structure in the electronic document rendered on a computing device; and
determining a second set of one or more font characteristics of the second digital font of the second digital text in the electronic document rendered on the computing device; and
identifying the first subset of digital fonts based on the second digital font, the second set of one or more font characteristics, and the second text structure.

* * * * *